United States Patent
Lim et al.

(10) Patent No.: US 10,929,945 B2
(45) Date of Patent: Feb. 23, 2021

(54) IMAGE CAPTURE DEVICES FEATURING INTELLIGENT USE OF LIGHTWEIGHT HARDWARE-GENERATED STATISTICS

(71) Applicant: Google Inc., Mountain View, CA (US)

(72) Inventors: Suk Hwan Lim, Mountain View, CA (US); Huizhong Chen, Mountain View, CA (US); David Chen, Mountain View, CA (US); Hsin-I Liu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 818 days.

(21) Appl. No.: 15/663,005

(22) Filed: Jul. 28, 2017

(65) Prior Publication Data
US 2019/0035047 A1    Jan. 31, 2019

(51) Int. Cl.
*G06T 1/20*    (2006.01)
*H04N 9/04*    (2006.01)
(Continued)

(52) U.S. Cl.
CPC ........... *G06T 1/20* (2013.01); *H04N 1/00832* (2013.01); *H04N 5/2353* (2013.01);
(Continued)

(58) Field of Classification Search
CPC .................. G06T 1/20; H04N 5/23218; H04N 5/232411; H04N 5/23241; H04N 5/232;
(Continued)

(56) References Cited

U.S. PATENT DOCUMENTS 5,790,692 A * 8/1998 Price .................... G01N 15/147
382/133
6,301,440 B1 * 10/2001 Bolle ................. G06K 9/00664
348/229.1
(Continued)

FOREIGN PATENT DOCUMENTS

EP          2879375       3/2015
WO     WO 2013/184256     12/2013

OTHER PUBLICATIONS

Sogaard, Jacob et al: "Video Quality Assessment and Machine Learning: Performance and Interpretability", 2015 Seventh International Workshop on Quality of Multimedia Experience (QOMEX), IEEE, May 26, 2015 (May 26, 2015), pp. 1-6. (Year: 2015).*
(Continued)

*Primary Examiner* — John R Lee
(74) *Attorney, Agent, or Firm* — Dority & Manning, PA

(57) ABSTRACT

The present disclosure provides image capture devices and associated methods that feature intelligent use of hardware-generated statistics. An example image capture device can include an imaging hardware pipeline that generates frames of imagery. The imaging hardware pipeline can generate one or more hardware-generated statistics based at least in part on, for example, the raw image data captured by the image sensor or intermediate image data within the pipeline. The image capture device can analyze the hardware-generated statistics to determine one or more metrics for the raw image data or the image. The image capture device can determine a downstream operation of the image capture device relative to the image based at least in part on the metrics determined from the hardware generated statistics.

19 Claims, 6 Drawing Sheets

(51) Int. Cl.
H04N 1/00 (2006.01)
H04N 5/232 (2006.01)
H04N 5/235 (2006.01)
H04N 9/64 (2006.01)
H04N 5/243 (2006.01)

(52) U.S. Cl.
CPC ..... *H04N 5/23212* (2013.01); *H04N 5/23218* (2018.08); *H04N 5/232411* (2018.08); *H04N 5/243* (2013.01); *H04N 9/045* (2013.01); *H04N 9/64* (2013.01)

(58) Field of Classification Search
CPC .. H04N 5/23212; H04N 5/2353; H04N 5/235; H04N 5/243; H04N 1/00832; H04N 9/045; H04N 9/64; G06K 9/00664; G06K 9/00711
See application file for complete search history.

(56) References Cited

U.S. PATENT DOCUMENTS

| | | | |
|---|---|---|---|
| 8,953,882 | B2 | 2/2015 | Lim et al. |
| 9,077,943 | B2 | 7/2015 | Lim |
| 2006/0139460 | A1* | 6/2006 | Ozaki ............... H04N 5/23212 348/222.1 |
| 2011/0019094 | A1* | 1/2011 | Rossignol ................ G06T 5/40 348/607 |
| 2011/0029635 | A1 | 2/2011 | Shkurko et al. |
| 2014/0161351 | A1 | 6/2014 | Yagnik |
| 2015/0116523 | A1* | 4/2015 | Sinha ................. H04N 5/23241 348/211.3 |
| 2015/0146979 | A1* | 5/2015 | Paliy .................... H04N 5/3572 382/167 |
| 2016/0014312 | A1* | 1/2016 | Nikkanen .......... H04N 5/23203 348/231.6 |
| 2016/0014421 | A1* | 1/2016 | Cote .................... H04N 19/196 382/170 |
| 2016/0057348 | A1* | 2/2016 | Liang .................... H04N 5/2358 348/222.1 |
| 2016/0070963 | A1 | 3/2016 | Chakraborty et al. |
| 2016/0182874 | A1* | 6/2016 | Richards ................... G06T 7/80 348/187 |
| 2016/0210716 | A1 | 7/2016 | Ghosh et al. |
| 2016/0232419 | A1* | 8/2016 | Bai ......................... G06T 5/007 |
| 2017/0277941 | A1* | 9/2017 | Smith ..................... G06T 7/246 |
| 2017/0280069 | A1* | 9/2017 | Smith .................... H04N 5/347 |

OTHER PUBLICATIONS

International Search Report with Written Opinion for PCT/US2018/027061 dated Jun. 22, 2018, 17 pages.
Sogaard et al., "Video Quality Assessment and Machine Learning: Performance and Interpretability", In Proceedings of Institute of Electrical and Electronics Engineers, Technical University of Denmark, Denmark, 2015, 6 pages (May 26, 2015).
Aghazadeh et al., " Novelty Detection :from an Ego-Centric Perspective, ", IEEE Conference on Computer Vision and Pattern Recognition, Colorado Springs, Colorado, Jun. 20-24, 2011, pp. 3297-3304.
Bouguet, "Pyramidal Implementation of the Affine Lucas Kanade Feature Tracker Description of the Algorithm", Intel Corporation Technical Report; Microprocessor Research Lab, Santa Clara, California, 2001, 10 pages.
Doherty et, al., "Investigating Keyframe Selection Methods in the Novel Domain of Passively Captured Visual Lifelogs", International Conference on Image and Video Retrieval, Jul. 7-9, 2008, Niagara Falls, Canada, 10 pages.
Gokalp et al., "Scene Classification using Bag of Regions Representations", IEEE Conference on Computer Vision and Pattern Recognition, Jun. 18-23, 2007, Minneapolis, Minnesota, 8 pages.

Gygli et al., " Creating Summaries from User Videos ", European Conference on Computer Vision, Zurich, Switzerland, Sep. 6-12, 2014, pp. 505-520.
Horn et al., "Determining Optical Flow." Artificial Intelligence, vol. 17, Issues 1-3, Aug. 1981, pp. 185-203.
Jain et al., "Displacement Measurement and its Application in Interframe Image Coding," IEEE Transactions on Communications., vol. COM-29, No. 12, Dec. 1981. pp. 1799-1808.
Khosla et al., " Large-Scale Video Summarization using Web-Image Priors ", IEEE Conference on Computer Vision and Pattern Recognition, Portland, Oregon, Jun. 23-28, 2013, pp. 2698-2705.
Lee et. al., "Discovering Important People and Objects for Egocentric Video Summarization", IEEE Conference on Computer Vision and Pattern Recognition, Jun. 16-21, 2012, Providence, Rhode Island, 8 pages.
Ling et al. "A Method for Fast Shot Boundary Detection Based on SVM", Congress on Image and Signal Processing, May 27-30, 2008, Sanya, Hainan, China, 5 pages.
Liu et al., " Brief and High-Interest Video Summary Generation: Evaluating the AT&T Labs Rushes Summarizations ", ACM TRECVid Video Summarization Workshop, Vancouver, British Columbia, Canada, Oct. 31, 2008, pp. 21-25.
Lu et al., "Fast Video Shot Boundary Detection Based on SVD and Pattern Matching", IEEE Transactions on Image Processing, vol. 22, Issue 12, Sep. 16, 2013, pp. 5136-5145.
Lu et al., "Story-Driven Summarization for Egocentric Video ", IEEE Conference on Computer Vision and Pattern Recognition, Portland, Oregon, Jun. 23-28, 2013, pp. 2714-2721.
Lucas et al., "An Iterative Image Registration Technique with an Application to Stereo Vision", Proceedings of DARPA Image Understanding Workshop, Apr. 1981, pp. 121-130.
Lupatini et al., "Scene Break Detection: A Comparison", Proceedings of the Workshop on Research Issues in Database Engineering, Feb. 23-24, 1998, Orlando, Florida, 8 pages.
Ma et al., "A Generic Framework of User Attention Model and its Application in Video Summarization", IEEE Transactions on Multimedia, vol. 7, Issue 5, Oct. 2005, pp. 907-919.
Marat et al., "Video Summarization using a Visual Attention Model", 15th European Signal Processing Conference, Poznan, Poland, Sep. 3-7, 2007, 5 pages.
Marpe et al., "The H.264/MPEG4 Advanced Video Coding Standard and its Applications," IEEE Communications Magazine, vol. 44, Aug. 2006. , pp. 134-143.
Mertens et al., " Exposure Fusion ", Pacific Conference on Computer Graphics and Applications, Maui, Hawaii, Oct. 29-Nov. 2, 2007, pp. 382-390.
Ngo et al., "On Clustering and Retrieval of Video Shots through Temporal Slices Analysis", IEEE Transactions on Multimedia, vol. 4, Issue 4, Dec. 2002, pp. 446-458.
Sheikh et. al., "Blind Quality Assessment for JPEG2000 Compressed Images", Conference Record of the Thirty-Seventh Asilomar Conference on Signals, Systems, and Computers, Nov. 9-12, 2003, Pacific Grove, California, 4 pages.
Swain et al., "Indexing via Color Histograms", Third International Conference on Computer Vision, Dec. 4-7, 1990, Osaka, Japan, 4 pages.
Wan et al., "A New Approach to image Retrieval with Hierarchical Color Clustering", IEEE Transactions on Circuits and Systems for Video Technology, vol. 8, No. 5, Sep. 2002, pp. 628-643.
Wang, "Objective Image Quality Assessment: Facing the Real World Challenges", Electronic Imaging, Image Quality and System Performance XIII, 2016, pp. 106 (no month) .
Wang et al., "Reduced and No Reference Visual Quality Assessment the Natural Scene Statistic Model Approach", IEEE Signal Processing Magazine, Special Issue on Multimedia Quality Assessment, vol. 29, Issue 6, Nov. 2011, pp. 29-40.
Wolf, "Key Frame Selection by Motion Analysis", International Conference on Acoustics, Speech, and Signal Processing, Atlanta, Georgia, May 7-10, 1996, pp. 1228-1231.

(56) References Cited

OTHER PUBLICATIONS

Zhu et al., "A New Diamond Search Algorithm for Fast Block-Matching Motion Estimation", IEEE Transactions on Image Processing, vol. 9, No. 2, Feb. 2000, pp. 287-290.

* cited by examiner

IMAGE CAPTURE DEVICES FEATURING INTELLIGENT USE OF LIGHTWEIGHT HARDWARE-GENERATED STATISTICS

FIELD

The present disclosure relates generally to image capture devices. More particularly, the present disclosure relates to image capture devices that feature intelligent use of lightweight hardware-generated statistics to, for example, improve resource efficiency.

BACKGROUND

An image capture device is a device that can capture imagery (e.g., in the form of image frames). Image capture devices include cameras, recorders, sensors, and/or other devices. In some instances, image capture devices can have a primary purpose other than capturing imagery. For example, image capture devices can include devices that are "camera-enabled" or have an image capture system embedded within the device such as, for example, certain smartphones, laptops, smart appliances, smart speakers, home manager devices, security systems, and the like. In some instances, image capture devices can be mobile image capture devices that are capable of being moved and/or image capture devices that are capable of being worn.

A primary challenge faced by the design and use of certain forms of image capture devices (e.g., mobile image capture devices and/or image capture devices that are able to be worn) is the resource-limited environment in which they operate. In particular, the design and use of image capture devices is commonly subject to the following constraints: a limited amount of memory to be used for image storage over a significant period of time; a limited amount of processing power or capability to continuously process imagery; a limited amount of energy available to operate over an extended period of time; and/or a limited amount of thermal power that can be dissipated (i.e., a device temperature that should not be exceeded so as to prevent overheating of the device or discomfort for the user, who may in some instances wear the mobile image capture device).

More particularly, certain image capture devices store captured imagery at a local memory for at least an initial period of time until such imagery can be transferred or transmitted to another device. However, due to memory component cost, size, or other factors, the image capture device typically will have only limited memory resources to dedicate toward storage of captured imagery. In an example scenario in which an image capture device is worn and operated for hours at a time (if not longer), the limited memory resources results in the device being unable to simply store a continuous stream of hours' worth of high resolution images. Furthermore, even if the image capture device had sufficient memory resources to store such continuous stream of hours' worth of images, this would present an additional problem of requiring the user to cull a massive amount of images to try and pick the best or most desirable ones.

As another example, certain image capture devices can be powered by a battery. Thus, in the most common use cases, the limited power budget provided by a battery must be spread across hours of device operation, if not longer. Therefore, operations performed by the image capture device which require or otherwise draw significant amounts of power must be limited or otherwise not continuously or commonly performed. As examples, the compression, storage, and transmission of images are the portions of a typical image processing cycle which consume the most significant amounts of power. Thus, in addition to a memory consumption problem, the compression and storage of massive amounts of imagery is an infeasible device design for the typical power budget provided by an on-board battery.

Similarly, despite advances in the size and ability of image processing chips, image devices will still typically have a limited amount of computational power which can be employed at any given moment in time.

Further, the resource constraints described above are typically highly interrelated. For example, even given an unlimited power, computation, and memory budget, continuous performance of high power processing operations would cause the mobile image capture device to dissipate heat at a level that would cause discomfort for the user or otherwise be undesirable.

Thus, the memory, processing, power, and thermal constraints associated with an image capture device can collectively represent a challenging limitation to the design and operation of a mobile image capture device.

SUMMARY

Aspects and advantages of embodiments of the present disclosure will be set forth in part in the following description, or can be learned from the description, or can be learned through practice of the embodiments.

One aspect of the present disclosure is directed to an image capture device. The image capture device includes an imaging hardware pipeline. The imaging hardware pipeline includes an image sensor that is operable to capture raw image data and one or more hardware blocks that are operable to process the raw image data to contribute to formation of an image. The imaging hardware pipeline generates one or more hardware-generated statistics. The image capture device includes one or more processors and one or more non-transitory computer-readable media that store instructions that, when executed by the one or more processors, cause the image capture device to perform operations. The operations include obtaining the one or more hardware-generated statistics generated by the imaging hardware pipeline. The operations include analyzing the one or more hardware-generated statistics to determine one or more metrics for the raw image data or the image. The operations include determining a downstream operation of the image capture device relative to the image based at least in part on the one or more metrics determined from the hardware-generated statistics.

Another aspect of the present disclosure is directed to a computing system. The computing system includes one or more processors and one or more non-transitory computer-readable media that store instructions that, when executed by the one or more processors, cause the image capture device to perform operations. The operations include obtaining one or more hardware-generated statistics generated by an imaging hardware pipeline. The imaging hardware pipeline includes an image sensor that is operable to capture raw image data and one or more hardware blocks that are operable to process the raw image data to contribute to formation of an image. The operations include analyzing the one or more hardware-generated statistics to determine one or more metrics for the raw image data or the image. The operations include determining a downstream operation of the computing system relative to the image based at least in part on the one or more metrics determined from the hardware-generated statistics.

Another aspect of the present disclosure is directed to a computer-implemented method. The method includes obtaining, by one or more computing devices, one or more hardware-generated statistics generated by an imaging hardware pipeline. The imaging hardware pipeline includes an image sensor that is operable to capture raw image data and one or more hardware blocks that are operable to process the raw image data to contribute to formation of an image. The method includes analyzing, by the one or more computing devices, the one or more hardware-generated statistics to determine one or more metrics for the raw image data or the image. The method includes determining, by the one or more computing devices, a downstream operation relative to the image based at least in part on the one or more metrics determined from the hardware-generated statistics.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
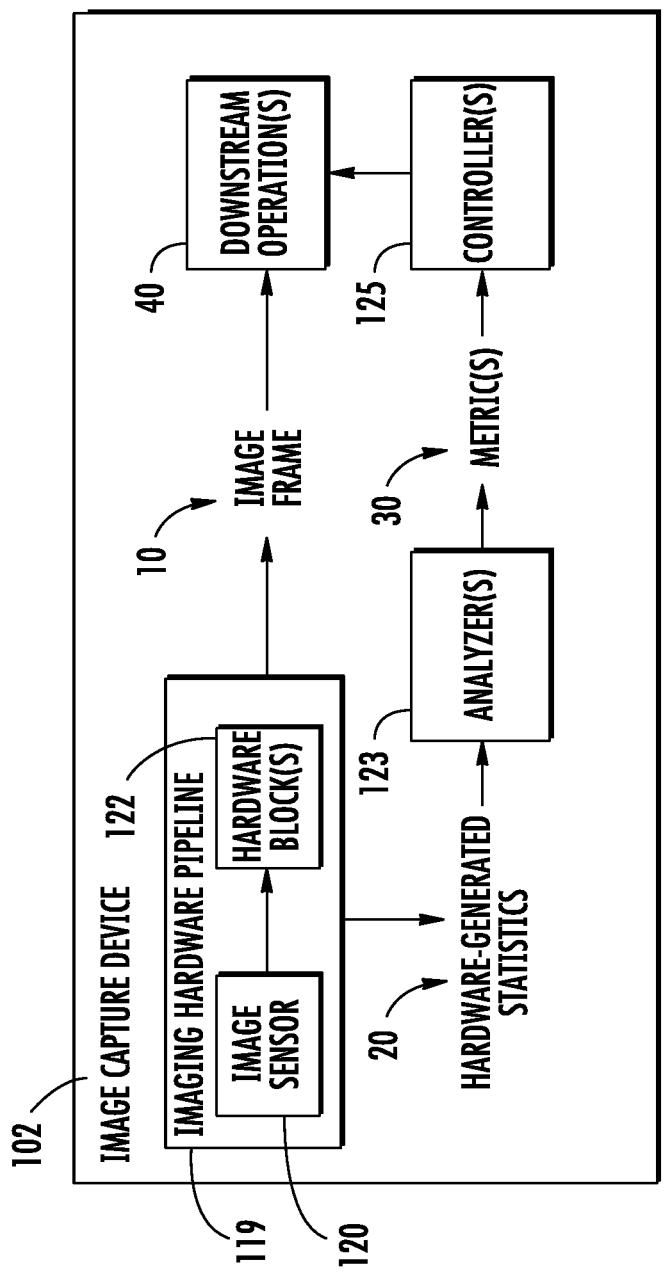
FIG. 1 depicts a block diagram of an example image capture device according to example embodiments of the present disclosure.

Generally, the present disclosure is directed to imaging systems and associated methods that feature intelligent use of hardware-generated statistics. In particular, an image capture device can include an imaging hardware pipeline that generates frames of imagery. The imaging hardware pipeline can include an image sensor that is operable to capture raw image data and one or more hardware blocks that are operable to process the raw image data to contribute to formation of an image. The imaging hardware pipeline can generate one or more hardware-generated statistics based at least in part on, for example, the raw image data captured by the image sensor or intermediate image data within the pipeline. In particular, according to an aspect of the present disclosure, these hardware-generated statistics are readily available with only a small amount of marginal energy expenditure and are thus very lightweight and computationally inexpensive. As examples, hardware-generated statistics can include auto exposure statistics, auto white balance statistics, auto focus statistics, thumbnails, color histograms, and/or high-frequency maps. Other near-free signals such as metadata, settings, and/or sensor data can also be used in addition to and/or derived from the hardware-generated statistics. In addition, these statistics and other near-free signals can be merged and/or processed to generate or derive additional information which can be used in addition or alternatively to direct use of the statistics.

According to another aspect of the present disclosure, the image capture device can analyze the hardware-generated statistics to determine one or more metrics for the raw image data or the image. In particular, the image capture device can include one or more analyzers that implement lightweight analysis algorithms on the hardware-generated statistics to determine the one or more metrics. Example metrics include a temporal similarity metric, a diversity metric, an image/video quality metric, and/or a motion saliency metric. In various implementations, the metrics can be or include vectors, two-dimensional maps, numbers, and/or other data structures.

According to another aspect of the present disclosure, the image capture device can determine a downstream operation of the image capture device relative to the image based at least in part on the metrics determined from the hardware generated statistics. Example downstream operations can include decisions about whether to save or discard the image, whether to provide the image to additional analysis algorithms that are relatively more computationally or energy intensive, whether to include the image in a video such as, for example, a hyperlapse video or burst video, and/or whether to select the image for inclusion in a curated summary (e.g., whether to select the image as a highlight image).

Thus, by performing lightweight analyses on computationally inexpensive hardware-generated statistics in order to guide decisions regarding downstream operations of the image capture device relative to the image, the image capture device can make such decisions in an extremely lightweight manner (e.g., in a manner which incurs or requires extremely low computational or energy expenditure). As such, the systems and methods described herein can provide significant savings of computational resources (e.g., available processing ability), energy resources (e.g., available battery power), and/or memory resources (e.g., available memory space) while the image capture device operates over time. In addition, reducing the computational and/or energy expenditure of the image capture device improves the thermal performance properties of the device. Furthermore, in addition or alternatively to the resource savings described above, the lightweight analyses on computationally inexpensive hardware-generated statistics can also improve image quality by, for example, communicating a measure of confidence of image quality. For example, the communicated measure of confidence can enable save logic to detect and discard low-quality image frames, thereby increasing the average quality of the captured imagery.

More particularly, as described above, a primary challenge faced by the design and use of certain forms of image capture devices (e.g., mobile image capture devices and/or image capture devices that are able to be worn) is the resource-limited environment in which they operate. While the present disclosure will be discussed primarily with reference to mobile image capture devices and/or image capture devices that are able to be worn, the systems, methods, techniques, and/or principles described herein are equally applicable to any form of image capture device (e.g. any device that includes a camera or otherwise captures images), any device or system that performs processing of imagery, and/or any device or system that uses image analysis to make decisions. The present disclosure is not limited to mobile image capture devices and/or image capture devices that are able to be worn, but instead includes all image capture devices and/or image processing systems or components. In one example, the technologies described herein can also be placed within an image sensor such that the analysis is done as part of the image sensor logic.

One particular example image capture device to which the concepts of the present disclosure are applicable is an "always-on" or "hands-free" intelligent, mobile image capture device that is subject to certain power and thermal constraints. As one example application, the mobile image capture device can be used to perform life logging, in which images are captured by the mobile image capture device over a period of time to document various events that occur during the user's daily life. As another similar example application, the mobile image capture device can be used to perform automatic and/or intelligent photo capture.

In some instances, the example device described above may have a thermal budget that is less than a certain number of milliwatts. Therefore, it may be advantageous to limit the power consumption of the device well below this number in order to allow for better image quality. The battery size is also important since the device should be mobile and/or able to be worn and therefore the size of the battery is constrained. Thus, in order to allow for long usage time while maintaining the size and weight of the device to be small, it is critical to maintain low power consumption.

In view of the above, one aspect of the present disclosure is directed to lightweight analyses for image and/or video analysis for image capture devices, including, for example, resource-constrained image capture devices.

In particular, as one example, one aspect or component of certain image capture devices (e.g., always-on intelligent devices) that significantly contributes to power and/or computational resource consumption is the use of a scene analysis component (also referred to as "scene analyzer") that analyzes a scene depicted by an image to determine how to handle (e.g., save, transfer, highlight, etc.) the image. For example, in some instances, the scene analyzer can include algorithmic components such as face detection, face recognition, scene classification, and/or object recognition. These algorithm components can be performed by neural networks such as, for example, convolutional neural networks, which have been shown to provide very good results for these applications and have also been recognized as state-of-the-art in terms of accuracy.

However, while there have been significant efforts to reduce the model size and number of operations for convolutional neural networks, convolutional neural networks typically still have higher computation requirements than other algorithmic or processing techniques, often leading to high power consumption. Since scene analysis can have many of such components, it is worthwhile to look at this from the point of "accuracy per joules" perspective. Also, it is recognized that from the final generation output perspective, it may not be critical to have the best individual component in terms of accuracy. If the marginal benefit of having additional accuracy for one learning algorithm is small in terms of user experience or final accuracy, then the additional accuracy gained by employing convolutional neural networks becomes less important. In other words, there may be certain instances in which it is desirable to develop a resource-efficient system that is good enough for the primary purpose of the device, rather than trying to implement the absolute best possible system in terms of accuracy.

In view of the above, according to one aspect of the present disclosure, the systems and methods described herein can implement lightweight algorithms as a pre-processing (or alternative processing) step for more heavyweight algorithms, including, for example, deep learning algorithms which rely upon neural network(s) such as convolutional neural networks. As one example, the lightweight algorithms can be used to filter out uninteresting images without having to run more sophisticated algorithms. If the lightweight analysis algorithm can reject a significant portion of the image frames, then sophisticated algorithms may be reserved for only certain relatively more interesting frames.

To this end, in some implementations, an image capture device or other image processing system can run the lightweight analysis algorithms described herein in real-time as new frames are streamed in. In some implementations, the image capture device can buffer and examine a history of features from the past as long as they are reasonable in size. In some implementations, the lightweight analysis algorithms described herein may take or reject images based on absolute measures rather than having to view an entire video or other history of captured images.

Thus, the present disclosure contrasts with the current paradigm for finding good image content, which is to add detectors for certain key categories such as faces, pets, etc. In particular, this current paradigm does not scale since it essentially purchases recall with the currency of energy of analysis: Heavyweight algorithms may allow a device to have high accuracy but consume large amounts of power. For power constrained devices, the power consumption is too high to be able to run these models at all times. In contrast, the present disclosure takes an alternative, complementary approach in which near-free signals are used in a more intelligent way than previous approaches.

One important aspect of the lightweight analyses described herein is to use near-free signals that are generated from sensors and/or imaging hardware (e.g., hardware-generated statistics). In particular, typically these near-free signals such as hardware-generated statistics are generated anyways for the purposes of performing auto exposure, auto white balance, and/or auto focus at the image formation stage.

Example near-free signals that can be used by the lightweight analyses described herein include metadata or settings that are freely available from the image capture parameters. Example metadata include pipe metadata and sensor metadata. Example settings include exposure time, analog gain, and digital gain. Additional near-free data includes sensor data such as inertial motion unit (IMU) signals (e.g., the angular velocity described by one or more IMUs). As one example, knowing the exposure times and ISO speed may give a strong indication as to what lighting conditions are expected. If those data types are coupled with histograms, then they provide even more information.

Additional example near-free signals that can be used by the lightweight analyses described herein include statistics provided by the imaging hardware pipeline. For example, the imaging pipeline typically generates statistics in order to perform or assist in performing auto exposure, auto white balance, and/or auto focus (e.g., when processing the raw image data to form an image frame). Additional example hardware-generated statistics include thumbnails, color histograms, luma histograms, and/or high-frequency maps, which are readily available with only a small amount of marginal energy expenditure. Auto exposure, auto white balance, and/or auto focus statistics can include auto focus patch filter sums, auto white balance patch pixel sums, and the like.

Additional example signals that can be used by the lightweight analyses described herein include signals from other blocks such as, for example, Harris corners. Information regarding image quality, image sharpness or blurriness, image noise, image similarity between previous frames, and/or other signals may also be obtained by further lightweight computing. Additional signals that can be obtained through lightweight computing include image saliency, skin detection, DoG, Harris, and/or other salient point/region detections.

As described above, the image capture device can include one or more analyzers that implement lightweight analysis algorithms on the hardware-generated statistics and/or other data or signals to determine one or more metrics for captured imagery or image data. The device can use these metric(s) to make decisions about downstream operations of the image capture device relative to the image (e.g., whether to save/discard, further analyze, highlight, or otherwise handle the image).

One example signal or metric that can be computed by the lightweight analyses described herein is a temporal similarity metric. For example, the temporal similarity metric can be determined for an image relative to at least one previously captured image based at least in part on one or more hardware-generated statistics (e.g., auto white balance statistics, auto focus statistics, auto focus statistics, and/or color histograms) and/or other data. In some implementations, the temporal similarity metric can provide a measure of how quickly the scene content is changing versus a previous frame.

In particular, in some implementations, an analyzer included in the image capture device can create a lightweight frame signature for the image based at least in part on hardware-generated statistics output by the imaging hardware pipeline. Thus, the temporal similarity metric can be calculated starting from already available statistics outputted by the hardware imaging pipeline. As a result, the temporal similarity metric can be generated with minimal power consumption and compute latency.

To provide an example, one hardware block in the pipeline (e.g., the RAW filter) typically generates statistics used in auto white balance and auto exposure control. The statistics are produced already for auto white balance and auto exposure operations, so they can be efficiently and freely reused by the analyzer for the purposes described herein. The analyzer can compare the frame signature for the image to one or more previous frame signatures respectively associated with one or more previously captured images to determine the temporal similarity metric for the image.

As one example use of the temporal similarity metric, the temporal similarity metric can be used to prevent running further analysis of an image when the image does not significantly change from a previous image frame. Thus, temporal coherence can be exploited in order to save computational complexity. For example, lightweight tracking algorithms and/or scene change detection algorithms (e.g., the temporal similarity metric) can be used to reduce the aggregate frequency at which more computationally expensive algorithms are used.

More particularly, while the image capture device may occasionally need to run computationally expensive algorithms such as, for example, convolutional neural network models, it is wasteful to run such computationally expensive algorithms frequently when the scene content is changing slowly. One potential solution to this issue is to invoke the computationally expensive algorithms at fixed intervals, regardless of the exact scene content.

However, the present disclosure provides a superior technique which may be referred to as lightweight temporal similarity for dynamic analysis control. In particular, a controller can be used to dynamically control invocation of one or more scene analysis algorithms including, for example, computationally expensive algorithms such as convolutional neural networks.

To conserve power, the controller itself can be orders of magnitude more lightweight and computationally efficient than the convolutional neural network models. This lightweight controller can take advantage of pre-existing signals in the system, like the imaging pipeline's hardware-generated statistics, to efficiently calculate for each frame captured by the image capture device. The controller can rely upon or otherwise use an accurate measure (e.g., the temporal similarity metric) of how quickly the scene is changing. In particular, the controller can use this measure to adjust the frequency of algorithm requests downstream. In addition, in instances in which the image capture device is able to be worn and the user is expected to be in motion, the controller can distinguish subtle variations due to slight user motion from larger variations caused by actual scene transitions.

As described above, the temporal similarity metric can quantify how quickly the scene content is changing. Based on this temporal similarity metric, the controller can adjust the request frequency associated with one or more computationally expensive algorithms or models included in the scene analysis engine, thereby achieving substantial savings and computation, with little impact on the quality of the save frames.

Another example signal or metric that can be computed by the lightweight analyses described herein is a diversity metric. For example, the diversity metric can be determined for an image relative to at least one previously captured image based at least in part on one or more hardware-generated statistics (e.g., auto white balance statistics, auto focus statistics, auto focus statistics, and/or color histograms) and/or other data. The diversity metric can describe a diversity of image relative to a corpus of previously captured images organized into clusters (e.g., based on scene content).

In particular, in some implementations, an analyzer included in the image capture device can create a lightweight frame signature for the image based at least in part on hardware-generated statistics output by the imaging hardware pipeline. For example, the lightweight frame signature can be created based on auto white balance statistics, auto focus statistics, auto focus statistics, and/or one or more color histograms provided for the image by the imaging hardware pipeline. As one example, the lightweight frame signature for an image can be created based on auto exposure patch sums.

The analyzer can compare the frame signature for the image to one or more previous frame signatures respectively associated with one or more previously captured images to determine the diversity metric for the image. In particular, in some implementations of the present disclosure, previously captured and saved images can be organized into clusters on the basis of their respective frame signatures (e.g., using incremental K-means quantization and/or tree-structured vector quantization).

The analyzer can compare the frame signature for a newly captured image to the existing clusters (e.g., to each cluster centroid) to determine a diversity metric for the image. For example, if the frame signature for the newly captured image results in formation of a new cluster or has a significant distance (e.g., greater than a threshold distance) from the closest cluster, then the new image can be scored as novel or otherwise diverse.

As one example use of the diversity metric, the diversity metric can be used to impact save decisions regarding image frames. For example, images that have diversity metrics that indicate they are more novel or otherwise diverse may be preferentially treated for saving (e.g., more likely to be saved). In such fashion, the overall diversity of the saved imagery can be increased. Thus, in some instances, this technique can be referred to as lightweight diversity clustering for increasing content diversity.

Another example signal or metric that can be computed by the lightweight analyses described herein is an image/video quality metric. For example, the image/video quality metric can be determined for an image based at least in part on one or more hardware-generated statistics and/or other data. The image/video quality metric for an image can be indicative of or include an auto exposure stability metric, an image blurriness metric, a noise level metric, and/or a generic logistic image quality score. These example quality metric(s) will be discussed in further detail below.

As an example use, the image/video quality metric can be used to prevent analyzing and/or saving hopelessly poor quality frames. Thus, while the actual content of the image is important, image quality and image saliency can provide useful clues as to the interestingness of the image content. As an example, finding out whether the scene does not change much or whether the scene is likely to be completely out of focus or in focus can provide useful information regarding interestingness of image content. For example, whether the scene is lit properly or in focus are good indicators. While quality is not the only indicator of whether the scene is save-worthy, quality can still be an effective tool to reject images that are very likely to be thrown away. Thus, in some instances, this technique can be referred to as lightweight image quality analysis for frame filtering and selection.

In another example, the image/video quality metric can be used for selecting and/or saving the frames needed for a hyperlapse video as well. By selecting adequate frames with good image quality and fewer artifacts, as indicated by the image/video quality metric, the resulting hyperlapse video can be improved.

Another example signal or metric that can be computed by the lightweight analyses described herein is a saliency metric such as, for example, a motion saliency metric, an object saliency metric, and/or a face saliency metric. For example, the motion saliency metric can be determined for an image based at least in part on one or more hardware-generated statistics and/or other data.

As an example, a saliency metric can be used to communicate salient regions on which further analysis should be performed, such that further analysis is not performed on areas of low saliency such as, for example, blue sky. Thus, image saliency metrics can allow the image capture device or other image processing system to limit the regions of the image that are analyzed. For example, skin-tone regions may be obtained in order to reduce the complexity of the face detection blocks.

As another example, a motion saliency metric can be indicative of the amount of motion included within the scene depicted by an image. In some implementations, the motion saliency metric for an image can be determined based on auto white balance and/or auto focus statistics reentered by the imaging hardware pipeline for such image. In particular, typically these statistics are collected by dividing the image into patches, where the statistics are aggregated for each patch. For example, in certain existing image processing chips, the auto white balance statistics contain the sums of raw pixel values within each patch, while the auto focus statistics contain the sums of bandpass filtered response within each patch. In other words, the auto white balance and auto focus statistics can be treated as a coarse representation of the frame.

In some implementations, for a pair of frames (e.g., every two consecutive frames), a motion saliency metric can be computed which measures the amount of discrepancy between local and global camera motion. For example, in some implementations, an analyzer can compute the motion saliency metric in three steps: 1) local motion estimation; 2) global motion estimation; and 3) motion difference computation. Local motion estimation can include computing dense motion vectors between the two frames. Global estimation can include estimating an affine model that describes the amount of global motion between the two frames.

The motion saliency metric can measure the amount of discrepancy between local and global camera motion. When there is a large local-global motion difference, it suggests that the image capture device has observed local object motion that is different from global motion. In some implementations, the motion saliency metric can be computed as the average of Euclidean distances between local and global motions, divided by the mean of global motion magnitude over the image.

As one example use of the motion saliency metric, when the motion saliency metric is greater than a certain threshold, the image capture device can respond by capturing a burst of frames, as the content is likely to be interesting. Over a period of time, if the image capture device has not captured a burst of frames, the device can more aggressively look for interesting content to capture. The motion saliency metric can be used as an important signal to suggest that something interesting has happened and trigger image capture.

As yet another example use, the motion saliency metric can be used to perform auto trimming of a burst. Users generally prefer moments that contain object motions. Therefore, when the motion saliency metric goes from a lower to higher, it suggests the start of a burst. Similarly, when motion saliency goes from high to low, it suggests the end of a burst. Thus, in some instances, this technique can be referred to as lightweight motion saliency metric for frame selection.

Another aspect of the present disclosure is directed to an intelligent image sensor that internally computes lightweight analysis signals or metrics. In particular, intelligent image sensors may combine logic, memory and sensory pixels into stacked die. Combining logic and memory together provides the image sensor advantages in terms of power consumption and the ability to use the image sensing data for photo curation. The use of lightweight analysis metrics significantly reduces the amount of energy and power consumption used by high power consumption models.

More particularly, the intelligent image sensor can include statistics blocks that can process the pixels as they come in. The image sensor can compute the statistics such that those statistics can be used for things like auto exposure, auto focus, and/or auto white balance. Thus, the image sensor statistics blocks can be computed within the intelligent sensor itself.

In addition, those image statistics can be tailored such that they can provide useful signals for lightweight analysis in addition to their traditional image processing purposes. Thus, the signals that are computed for auto exposure, auto focus, and/or auto white balance can be specifically tailored or otherwise modified for determining whether content is salient, whether there are enough changes between the content, and/or whether there are any image quality issues. This information can be used for various purposes, such as, for example, save decisions, curation decisions, and/or other decisions as described herein.

Thus, the present disclosure provides image capture devices and associated methods that feature intelligent use of hardware-generated statistics. In particular, an image capture device can include an imaging hardware pipeline that generates one or more hardware-generated statistics based at least in part on, for example, the raw image data captured by the image sensor or intermediate image data within the pipeline. The image capture device can analyze the hardware-generated statistics to determine one or more metrics for the raw image data or the image and can determine a downstream operation of the image capture device relative to the image based at least in part on the metrics determined from the hardware generated statistics.

The systems and method of the present disclosure provide a number of technical effects and benefits. As an example, by performing lightweight analyses on computationally inexpensive hardware-generated statistics in order to guide decisions regarding downstream operations of the image capture device relative to the image, the image capture device can make such decisions in an extremely lightweight manner (e.g., in a manner which incurs or requires extremely low computational or energy expenditure). As such, the systems and methods described herein can provide significant savings of computational resources (e.g., available processing ability), energy resources (e.g., available battery power), and/or memory resources (e.g., available memory space) while the image capture device operates over time. In addition, reducing the computational and/or energy expenditure of the image capture device improves the thermal performance properties of the device. Furthermore, in addition or alternatively to the resource savings described above, the lightweight analyses on computationally inexpensive hardware-generated statistics can also improve image quality by, for example, communicating a measure of confidence of image quality. For example, the communicated measure of confidence can enable save logic to detect and discard poor image frames, thereby increasing the average quality of the captured imagery.

With reference now to the Figures, example embodiments of the present disclosure will be discussed in further detail.

FIG. 1 depicts a block diagram of an example image capture device 102 according to example embodiments of the present disclosure. The image capture device 102 can include an imaging hardware pipeline 119 that generates frames of imagery 10. The imaging hardware pipeline 119 can include an image sensor 120 that is operable to capture raw image data. The imaging hardware pipeline 119 can also include one or more hardware blocks 122 that are operable to process the raw image data to contribute to formation of an image frame 10. The imaging hardware pipeline 119 can also include various other components, blocks, and/or subsystems that contribute to formation of the image(s) 10 based on raw image data captured by the image sensor 120. In particular, while the one or more hardware blocks 122 contribute to formation of the image frame 10, it is not strictly necessary that one of the hardware blocks 122 actually form the final output image frame 10. Instead, in some implementations, the blocks 122 can simply perform intermediate processing that contributes to formation of the image frame 10.

In some implementations, the one or more hardware blocks 122 can be included in a specialized digital signal processor which can be referred to as an image processor. Example hardware blocks 122 that can be included in the imaging hardware pipeline include a RAW filter block; a bad pixel correction block; a raw denoise block; a black level (flare) correction block; a lens shading correction block; a white balance block; a demosaicer block; a Bayer transformation block; a demosaicing block; a color correction block; a gamma correction block; a tone mapping block; and/or a color space convert block.

The imaging hardware pipeline 119 can also generate one or more hardware-generated statistics 20 based at least in part on, for example, the raw image data captured by the image sensor 120 or intermediate image data within the pipeline 119. In particular, according to an aspect of the present disclosure, these hardware-generated statistics 20 are readily available with only a small amount of marginal energy expenditure and are thus very lightweight and computationally inexpensive. As examples, hardware-generated statistics 20 can include auto exposure statistics, auto white balance statistics, auto focus statistics, thumbnails, color histograms, and/or high-frequency maps. Other near-free signals such as metadata, settings, and/or sensor data can also be used in addition to and/or derived from the hardware-generated statistics.

According to another aspect of the present disclosure, the image capture device 102 can analyze the hardware-generated statistics 20 to determine one or more metrics 30 for the raw image data or the image 10. In particular, the image capture device 102 can include one or more analyzers 123 that implement lightweight analysis algorithms on the hardware-generated statistics 20 to determine the one or more metrics 30. Example metrics 30 include a temporal similarity metric, a diversity metric, an image/video quality metric, an objectness probability metric, and/or a saliency metric such as a motion saliency metric, an object saliency metric, and/or a face saliency metric.

According to another aspect of the present disclosure, the image capture device 102 can determine a downstream operation 40 of the image capture device 102 relative to the image 10 based at least in part on the metrics 30 determined from the hardware generated statistics 20. In particular, the image capture device 102 can include one or more controllers 125 that respectively determine and/or control the downstream operation(s) 40 based at least in part on the metric(s) 30.

One example downstream operation 40 includes or is impacted by a decision about whether to save the image 10

(e.g., by compressing and writing a non-temporary copy of the image 10 to a non-volatile memory) or to discard the image 10 without saving the image 10 (e.g., by discarding a temporary copy of the image 10 from a temporary image memory buffer (e.g., volatile memory) without saving the non-temporary copy in the non-volatile memory). Additional example downstream operations 40 can include or be impacted by decisions regarding whether to provide the image 10 to additional analysis algorithms that are relatively more computationally or energy intensive, whether to include the image 10 in a video such as, for example, a hyperlapse video or burst video, and/or whether to select the image 10 for inclusion in a curated summary (e.g., whether to select the image as a highlight image, transfer the image to another device, etc.).

Thus, in some implementations, the image capture device 102 can implement the lightweight algorithms (e.g. as performed by the analyzers 123 and/or controllers 125) as a pre-processing (or alternative processing) step for more heavyweight algorithms, including, for example, deep learning algorithms which rely upon neural network(s) such as convolutional neural networks. As one example, the lightweight algorithms can be used to filter out uninteresting images without having to run more sophisticated algorithms. If the lightweight analysis algorithm can reject a significant portion of the image frames, then sophisticated algorithms may be reserved for only certain relatively more interesting frames.

To this end, in some implementations, the image capture device 102 can run the lightweight analysis algorithms described herein in real-time as new frames 10 are streamed in. In some implementations, the image capture device 102 (e.g., one or more analyzer(s) 123 and/or controller(s) 125) can buffer and examine a history of features from the past as long as they are reasonable in size. In some implementations, the lightweight analysis algorithms described herein may take or reject images based on absolute measures rather than having to view an entire video or other history of captured images.

Thus, the present disclosure contrasts with the current paradigm for finding good image content, which is to add detectors for certain key categories such as faces, pets, etc. In particular, this current paradigm does not scale since it essentially purchases recall with the currency of energy of analysis: Heavyweight algorithms may allow a device to have high accuracy but consume large amounts of power. For power constrained devices, the power consumption is too high to be able to run these models at all times. In contrast, the present disclosure takes an alternative, complementary approach in which near-free signals are used in a more intelligent way than previous approaches.

One important aspect of the lightweight analyses described herein is to use near-free signals that are generated from sensors and/or imaging hardware (e.g., hardware-generated statistics 20). In particular, typically these near-free signals such as hardware-generated statistics 20 are generated anyways for the purposes of performing auto exposure, auto white balance, and/or auto focus at the image formation stage.

Example near-free signals that can be used by the image capture device 102 (e.g., analyzer(s) 123 and/or controller(s) 125) include metadata or settings that are freely available from the image capture parameters. Example metadata include pipe metadata and sensor metadata. Example settings include exposure time, analog gain, and digital gain. Additional near-free data includes sensor data such as inertial motion unit (IMU) signals (e.g., the angular velocity described by one or more IMUs). As one example, knowing the exposure times and ISO speed may give a strong indication as to what lighting conditions are expected. If those data types are coupled with histograms, then they provide even more information.

Additional example near-free signals that can be used by the image capture device 102 (e.g., analyzer(s) 123 and/or controller(s) 125) include statistics 20 provided by the imaging hardware pipeline. For example, the imaging pipeline 119 typically generates statistics 20 in order to perform or assist in performing auto exposure, auto white balance, and/or auto focus (e.g., when processing the raw image data to form an image frame). Additional example hardware-generated statistics 20 include thumbnails, color histograms, luma histograms, and/or high-frequency maps, which are readily available with only a small amount of marginal energy expenditure. Auto exposure, auto white balance, and/or auto focus statistics 20 can include auto focus patch filter sums, auto white balance patch pixel sums, and the like.

Additional example signals that can be used by the image capture device 102 (e.g., analyzer(s) 123 and/or controller(s) 125) include signals from other blocks such as, for example, Harris corners. Information regarding image quality, image sharpness or blurriness, image noise, image similarity, image similarity between previous frames, and/or other signals may also be obtained by further lightweight computing. Additional signals that can be obtained through lightweight computing include image saliency, skin detection, DoG, Harris, and/or other salient point/region detections.

As described above, the image capture device 102 can include one or more analyzers 123 that implement lightweight analysis algorithms on the hardware-generated statistics 20 and/or other data or signals to determine one or more metrics 30 for captured imagery or image data. The device 120 (e.g., analyzers 123 and/or controllers 125) can use these metric(s) 30 to make decisions about downstream operations 40 of the image capture device relative to the image (e.g., whether to save/discard, further analyze, highlight, or otherwise handle the image).

By performing lightweight analyses on computationally inexpensive hardware-generated statistics 20 in order to guide decisions regarding downstream operations 40 of the image capture device 102 relative to the image 10, the image capture device 102 can make such decisions in an extremely lightweight manner (e.g., in a manner which incurs or requires extremely low computational or energy expenditure). As such, the image capture device 102 can provide significant savings of computational resources (e.g., available processing ability), energy resources (e.g., available battery power), and/or memory resources (e.g., available memory space) while the image capture device 102 operates over time. In addition, reducing the computational and/or energy expenditure of the image capture device 102 improves the thermal performance properties of the device 102. Furthermore, in addition or alternatively to the resource savings described above, the lightweight analyses on computationally inexpensive hardware-generated statistics 20 can also improve image quality by, for example, communicating a measure of confidence of image quality. For example, the communicated measure of confidence can enable save logic to detect and discard poor image frames, thereby increasing the average quality of the captured imagery.

One example signal or metric 30 that can be computed by an analyzer 123 is a temporal similarity metric. For example, the temporal similarity metric can be determined for an image 10 relative to at least one previously captured image based at least in part on one or more hardware-generated statistics 20 (e.g., auto white balance statistics, auto focus statistics, auto focus statistics, and/or color histograms) and/or other data. In some implementations, the temporal similarity metric can provide a measure of how quickly the scene content is changing versus a previous frame.

In particular, in some implementations, an analyzer 123 included in the image capture device 102 can create a lightweight frame signature for each image 10 based at least in part on hardware-generated statistics 20 output by the imaging hardware pipeline 119. Thus, the temporal similarity metric can be calculated starting from already available statistics outputted by the hardware imaging pipeline 119. As a result, the temporal similarity metric can be generated with minimal power consumption and compute latency.

To provide an example, one hardware block 122 in the pipeline 119 (e.g., the RAW filter) typically generates statistics 20 used in auto white balance and auto exposure control. The statistics 20 are produced already for auto white balance and auto exposure operations, so they can be efficiently and freely reused by the analyzer 123 for the purposes described herein. The analyzer 123 can compare the frame signature for the image 10 to one or more previous frame signatures respectively associated with one or more previously captured images to determine the temporal similarity metric for the image 10.

In some implementations, the analyzer 123 can create the lightweight frame signature for the image 10 based at least in part on one or more hardware-generated color histograms provided for the image by the imaging hardware pipeline 119 (e.g., a red histogram, a blue histogram, and/or green histogram).

Such use of hardware-generated color histograms provided for the image by the imaging hardware pipeline 119 contrasts with certain existing techniques which explicitly compute the color histograms for an image from the fully processed image frame—after auto white balance, color correction, gamma correction, tone mapping, and/or JPEG compression have been performed.

By contrast, implementations of the present disclosure directly utilize the color histograms outputted already by the imaging hardware pipeline for a pre-processed RAW image, so no additional computation is required to obtain the histogram.

Alternatively or additionally to use of the color histograms, in some implementations, the analyzer 123 can create the lightweight frame signature for the image 10 based at least in part on auto white balance statistics, auto focus statistics, and/or auto focus statistics provided for the image 10 by the imaging hardware pipeline 119. In some instances, these statistics can be collectively referred to as "3A statistics". As one example, the lightweight frame signature for an image can be created based on patch sums from the 3A statistics (e.g., auto exposure patch sums).

More particularly, in some implementations, one of the hardware-generated statistics 20 is a set of histograms for the red (R), green (G), and blue (B) color channels of an image frame 10. Each channel c in {R, G, B} yields an N-bin histogram (e.g., N=128). Let this histogram for channel c be denoted as $H_c[i] (i=0, , N-1)$, where $H_c[i]$ counts how many pixels in channel c of the frame have the value i.

In some implementations, from the original hardware-generated histogram $H_c[i]$, the analyzer 123 can apply a power law regularization to reduce the effects of peaky components: $H_{c_p}[i] = H_c[i]^\alpha$. The exponent alpha can typically lie in the range (0, 1). Values closer to 0 reduce the relative importance of peaky components more aggressively. Power-law-regularized histogram can form an intermediate version of the lightweight frame signature for an image 10.

The benefits of reducing the relative influence of peaky components in the histogram were observed in a frame matching experiment. In the experiment, 250,000 frame pairs were taken which were visually judged be matching and 250,000 frame pairs were taken which were visually judged be nonmatching. The distances between every matching pair's frame signatures and every nonmatching pair's frame signatures were calculated. Next, a receiving operating characteristic of the true positive rate versus the false positive rate was evaluated. It was observed that by applying a power-law-regularization, the receiver operating characteristic of the frame signature could be noticeably improved.

In addition, in some instances, the stream of image frames can have different resolutions. For example, a particular image capture device may support full-resolution (e.g., 4000×3000), mid-resolution (e.g., 2000×1500), and/or low-resolution (e.g., 1332×1000) frames in the same stream. As a result, the counts in the histogram $H_{c_p}$ can be quite different between high-resolution, mid-resolution, and low-resolution frames. This makes it difficult to directly compare histograms from two frames of different resolutions.

As a solution to this issue, in some implementations, the power-law-regularized histograms can be subsequently normalized to have a unit sum of one, so that the signature can be regarded as a probability mass function (PMF). During the normalization, additive smoothing can be applied to reduce quantization effects. The PMF can be given by the following, where β is an additive prior.

$$PMF[i] = \left(H_{c_p}[i] + \beta\right) \bigg/ \left[\sum_{j=0}^{N-1} H_{c_p}[j] + N\beta\right]$$

As a result of the above normalization, even if two frames have different resolutions, their PMFs are directly comparable.

Figure 2:
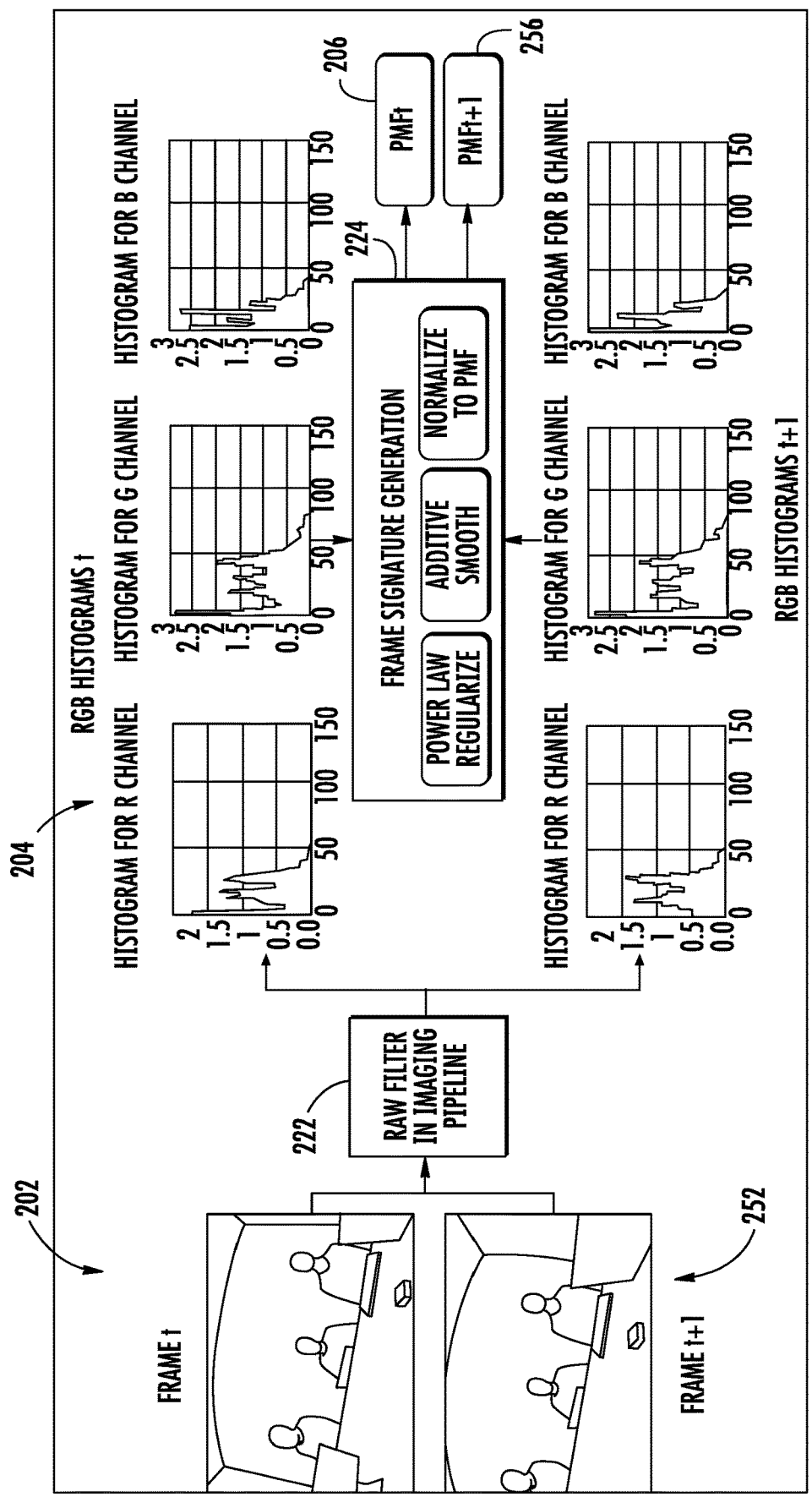
FIG. 2 depicts a block diagram of an example system to form frame signatures from hardware-generated statistics output by an imaging hardware pipeline according to example embodiments of the present disclosure.

As one example, FIG. 2 illustrates two image frames 202 and 252. A RAW filter 222 outputs RGB histograms 204 and 254 respectively for the images 202 and 252. A frame signature generator 224 generates frame signatures respectively for each image 202 and 252 based on the respective RGB histograms 204 and 254. In particular, the frame signature generator 224 generates a PMF 206 for the image 202 and a PMF 256 for the image 252.

Although FIG. 2 illustrates the use of RGB histograms 204 and 524 to generate the frame signatures 206 and 256, in some implementations, alternatively or additionally to use of the color histograms, 3A statistics can be used to generate the frame signatures 206 and 256. For example, a same or similar process as illustrated in FIG. 2 can be applied to the 3A statistics in addition or alternatively to the RGB histograms 204 and 254. In one particular example, the lightweight frame signatures 206 and 256 can be created based on patch sums from the 3A statistics (e.g., auto exposure patch sums).

Referring again to FIG. 1, the analyzer 123 can determine the temporal similarity metric 30 based on the frame signature for an image 10 relative to at least one previously captured image (e.g., the most recently previously captured image). In some implementations, to determine the temporal similarity metric 30 based on the frame signatures, the analyzer 123 can quantify a relative distance between the two frames' frame signatures and, in particular, between their respective PMFs. Let $PMF_1$ and $PMF_2$ denote the PMFs of frames 1 and 2, respectively. Then, one or more of a variety of distance metrics can be employed, including one or more of the following distance metrics, which can be computed very efficiently:

L1 Distance:

$$D(PMF_1, PMF_2) = \sum_{j=0}^{N-1} \{PMF_1[j] - PMF_2[j]\}$$

L2 Distance:

$$D(PMF_1, PMF_2) = sqrt\left(\sum_{j=0}^{N-1} \{(PMF_1[j] - PMF_2[j])^2\}\right)$$

Hellinger Distance:

$$D(PMF_1, PMF_2) =$$
$$sqrt\left(\sum_{j=0}^{N-1} \{[sqrt(PMF_1[j]) - sqrt(PMF_2[j])]^2\}\right) / sqrt(2)$$

As indicated above, the temporal similarity metric should be efficient to calculate in order to be used for power conservation. An experiment using an example intelligent mobile image capture device demonstrated that the temporal similarity metric (e.g., both frame signature formation and distance calculation portions combined) can be computed in around 1 millisecond on a single LEON OS core. By comparison, the example convolutional neural network-based scene analysis models utilized by the same device require around 60-100 milliseconds per invocation.

In view of the above, as one example use of the temporal similarity metric, the temporal similarity metric can be used to prevent running further analysis of an image when the image does not significantly change from a previous image frame. More particularly, the temporal similarity metric can be used to dynamically adjust usage of a relatively more computationally expensive algorithm such as, for example, use of a convolutional neural network model or other scene analysis components.

In particular, in some implementations, the image capture device can include a shot controller that decides which frames are saved (e.g., non-temporarily saved). In some implementations, the shot controller can make these frame saving decisions by issuing convolutional neural network-based analyses on the frames, including invoking models for face detection, face attributes, face signatures, and/or image content. How often each model is invoked is decided by the shot controller's analysis policy evaluator. This policy evaluator takes as input an analysis policy, which specifies a minimum analysis interval $T_{min}$ and a maximum analysis interval $T_{max}$ for a given convolutional neural network model. For example, if $[T_{min}, T_{max}]=[500,1000]$ milliseconds for face detection, then the analysis policy evaluator will ensure that the face detection model is run at least once every 1000 milliseconds and at most once every 500 milliseconds.

Figure 3:
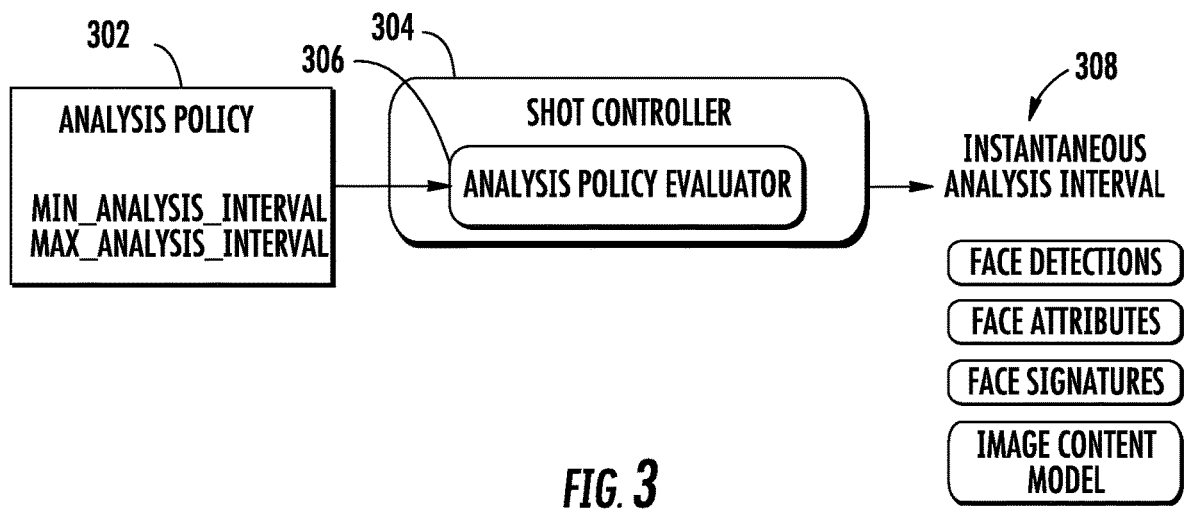
FIG. 3 depicts a block diagram of an example system to control the frequency of convolutional neural network model requests according to example embodiments of the present disclosure.

Thus, one potential technique for controlling invocation of models (e.g., CNN-based scene analysis models) is to fix a default analysis policy evaluator at a fixed interval between the min and max intervals for each model. As an example, FIG. 3 depicts a block diagram of an example system to control the frequency of convolutional neural network model requests according to example embodiments of the present disclosure. The system includes a shot controller 304. The shot controller 304 includes an analysis policy evaluator 302 that provides an instantaneous analysis interval 308 for each of a number of different scene analysis components through evaluation of an analysis policy.

However, the system and technique illustrated in FIG. 3 ignores how quickly the scene content is changing. Therefore, according to an aspect of the present disclosure, in some implementations, the image capture device can use the lightweight temporal similarity metric to set an instantaneous interval $T=w_{min}(t)T_{min}+(1-w_{min}(t))T_{max}$ at the current time t. The weight $w_{min}(t)$ can be dynamically adjusted based on recent measurements of the temporal similarity metric before time t.

Figure 4:
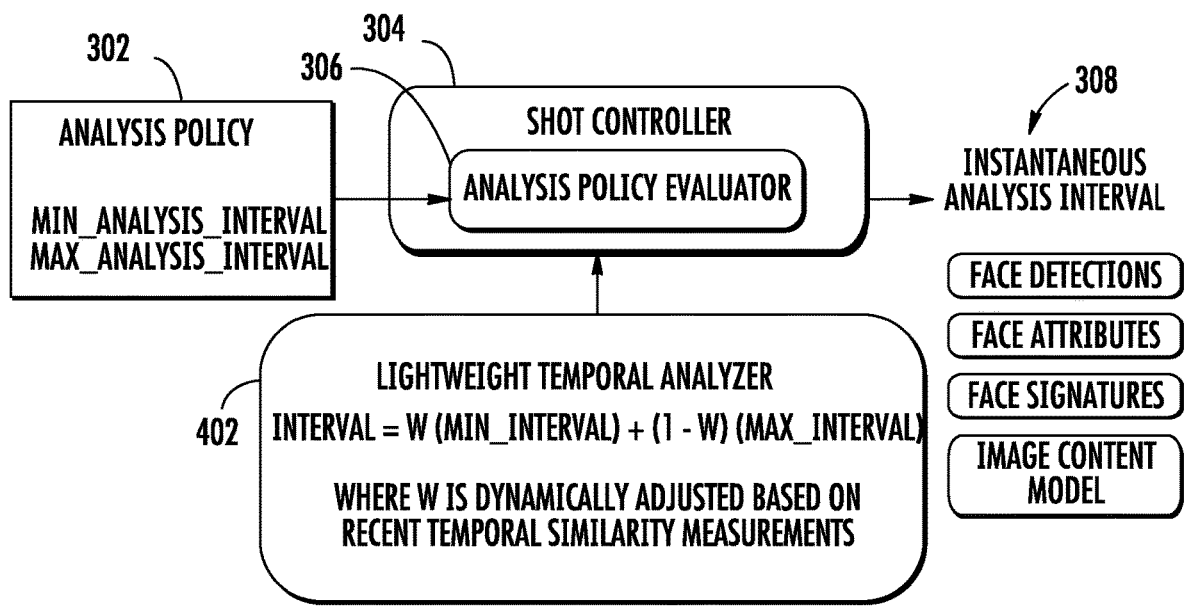
FIG. 4 depicts a block diagram of an example system to dynamically control the frequency of convolutional neural network model requests based on a lightweight temporal similarity metric according to example embodiments of the present disclosure.

As an example of this concept, FIG. 4 depicts a block diagram of an example system to dynamically control the frequency of convolutional neural network model requests based on a lightweight temporal similarity metric according to example embodiments of the present disclosure. The system illustrated in FIG. 4 includes a lightweight temporal analyzer 402. The analyzer 402 determines a temporal similarity metric for an image (e.g., through distance comparison of frame signatures of consecutive or near-consecutive images) and adjusts a weight based on such temporal similarity metric. By adjusting the weight, the analyzer 402 can adjust the instantaneous analysis interval 308 provided by the analysis policy evaluator 306 of the shot controller 304.

The following are some example techniques that can be used for setting the value of $w_{min}(t)$.

Time since last major scene transition: Select a reference frame at time $t_{trans}$. Compare another frame at time $t_{other}$ in terms of the PMF distance metric $D(PMF_{t_{trans}}, PMF_{t_{other}})$. If $D(PMF_{t_{trans}}, PMF_{t_{other}})$ exceeds some threshold, reset $t_{trans}$ to $t_{other}$ to mark the time of the latest major scene transition. Then, at the current time t, set the weight $w_{min}(t)$ in the dynamic policy evaluation as:

$$w_{min}(t) = \exp\left(\frac{-|t - t_{trans}|}{time_{decay}}\right)$$

where the $time_{decay}$ factor controls how quickly the weight $w_{min}(t)$ decays. As more time elapses since the last transition time $t_{trans}$, $w_{min}(t)$ decreases towards 0 and $w_{max}(t)=1-w_{min}(t)$ increases towards 1. This lengthens the analysis interval when the scene content is changing slowly, and shortens the analysis interval when the scene content is changing quickly.

Number of major scene transitions in recent history: As before, when the PMF distance metric $D(PMF_{t_{trans}}, PMF_{t_{other}})$ exceeds a threshold, regard this as a sign of a major scene transition. Count the number of such transitions $N_{trans}$ which have occurred in the last $T_{window}$ seconds. Then, set the weight $w_{min}(t)$ in the dynamic policy evaluation as:

$$w_{min}(t) = 1 - \exp\left(-\frac{N_{trans}}{count_{decay}}\right)$$

When $N_{trans}=0$ (e.g., no transitions recently), $w_{min}(t)=0$ and $w_{max}(t)=1-w_{min}(t)=1$, which results in lengthening the analysis interval to the max allowable value. Conversely, when $N_{trans}$ increases (e.g., more transitions recently), then $w_{min}(t)$ increases towards 1 and $w_{msx}(t)$ decreases towards 0. The $count_{decay}$ factor operates in a similar manner to the $time_{decay}$ factor.

Thus, the temporal similarity metric can be integrated into a shot controller of the image capture device. Measurements on prerecorded videos have demonstrated a reduction in face attributes and face detection calculations by 83% and 24%, respectively, while incurring less than 1% change in precision/recall of labeled desirable moments. Other experiments have demonstrated a reduction in image content model and face attributes calculations by 67% and 46%, respectively, while incurring less than 1% change in precision/recall of desirable moments. Thus, the dynamic control based on the temporal similarly metric provides significant resource savings with very little loss of accuracy.

In addition, any system or product that occasionally runs relatively higher computationally expensive models (e.g., convolutional neural networks) on a stream of frames can benefit from the lightweight temporal similarity metric. This can include any camera-equipped mobile device running any CNN-based scene analysis or object detection algorithms. The temporal similarly metric leverages hardware-generated statistics typically generated already for auto white balance and auto exposure which are widely available on most cameras. The frame signatures are very efficient to calculate on a general purpose CPU. In some implementations, determinations regarding scene transitions are generic and not specific to any particular scene content. Thus, the temporal similarity metric is widely applicable to many devices and scenarios, including existing devices.

Referring again to FIG. 1, another example signal or metric that can be computed by the lightweight analyses described herein is a diversity metric. For example, the diversity metric can be determined for an image 10 relative to at least one previously captured image based at least in part on one or more hardware-generated statistics 20 (e.g., 3A statistics and/or color histograms) and/or other data. The diversity metric can describe a diversity of the image relative to a corpus of previously captured images organized into clusters (e.g., based on scene content).

In particular, in some implementations, an analyzer 123 included in the image capture device 102 can create a lightweight frame signature for the image 10 based at least in part on hardware-generated statistics 20 output by the imaging hardware pipeline 119. For example, the lightweight frame signature can be created based on 3A statistics (e.g., auto exposure patch sums) and/or one or more color histograms provided for the image 10 by the imaging hardware pipeline 119.

The analyzer 123 can compare the frame signature for the image 10 to one or more previous frame signatures respectively associated with one or more previously captured images to determine the diversity metric for the image 10. In particular, in some implementations of the present disclosure, previously captured and saved images can be organized into clusters on the basis of their respective frame signatures (e.g., using incremental K-means quantization and/or tree-structured vector quantization).

The analyzer 123 can compare the frame signature for a newly captured image 10 to the existing clusters (e.g., to each cluster centroid) to determine a diversity metric for the image. For example, if the frame signature for the newly captured image 10 results in formation of a new cluster or has a significant distance (e.g., greater than a threshold distance) from the closest cluster, then the new image 10 can be scored as novel or otherwise diverse.

As one example use of the diversity metric, the diversity metric can be used to impact save decisions regarding image frames. For example, images that have diversity metrics that indicate they are more novel or otherwise diverse may be preferentially treated for saving (e.g., more likely to be saved). In such fashion, the overall diversity of the saved imagery can be increased. Thus, in some instances, this technique can be referred to as lightweight diversity clustering for increasing content diversity.

Figure 5:
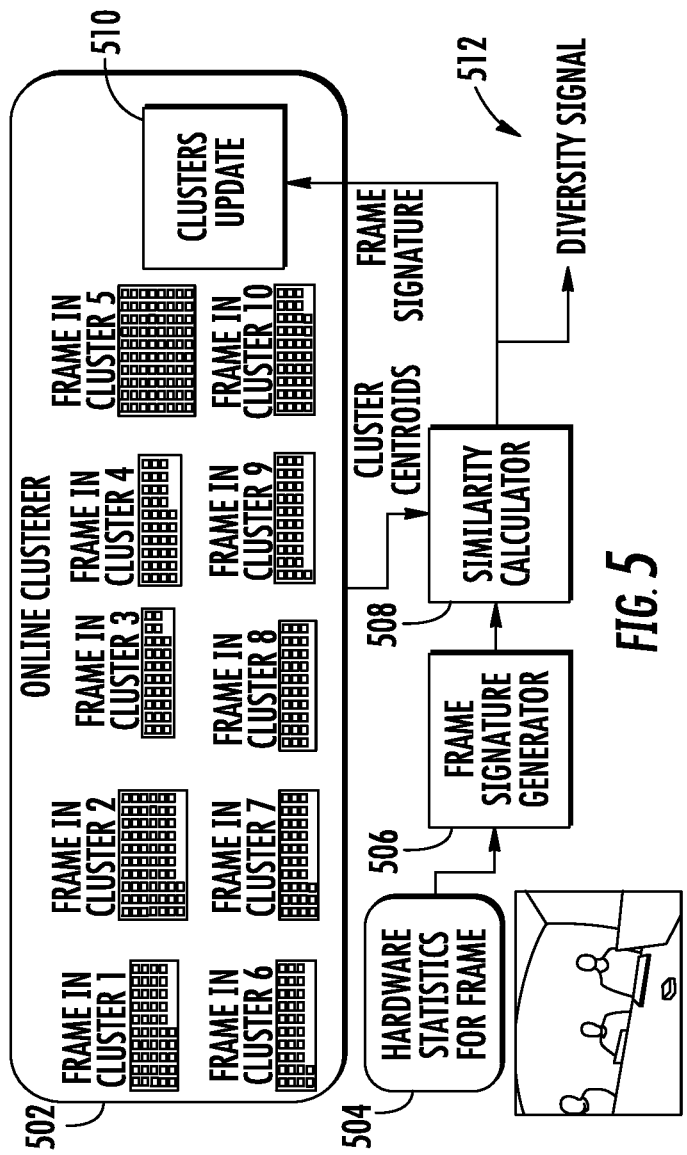
FIG. 5 depicts a block diagram of an example diversity metric analysis system according to example embodiments of the present disclosure.

As one example, FIG. 5 depicts a block diagram of an example diversity metric analysis system according to example embodiments of the present disclosure. In an example, the system depicted in FIG. 5 can be included in an analyzer 123.

The system of FIG. 5 includes an online clusterer 502, a frame signature generator 506, and a similarity calculator 508. The online clusterer 502 includes a clusters updater 510. The system generates a diversity signal or metric 512 for an image based at least in part on hardware-generated statistics 504 associated with the image frame.

More particularly, in some implementations, one of the hardware-generated statistics 504 is a set of histograms for the red (R), green (G), and blue (B) color channels of a frame, which, in some instances, were designed originally for auto white balance (AWB) and auto exposure (AE) control.

First, consider a global histogram which aggregates statistics from across the entire frame. Each channel c in {R, G, B} yields an N-bin histogram (e.g., N=128). Let this histogram for channel c be denoted as $H_c[i]$ (i=0, , N−1), where $H_c[i]$ counts how many pixels in channel c of the frame have the value i.

Alternatively, consider a local histogram which aggregates statistics separately in T different non-overlapping tiles of a frame. Within tile t, we form the local histogram for channel c as $H_{t_c}[i]$ (i=0, , N−1), where $H_{t_c}[i]$ counts how many pixels of tile tin channel c have value i. Because the techniques described herein work for both global and local histograms, hereafter the operations are only described as applied to a global histogram, with the understanding that the same technique applies equally well to a set of local histograms.

The frame signature generator 506 can generate a frame signature for the image based at least in part on the hardware-generated statistics 504. As an example, in some implementations, from the original histogram $H_c[i]$, a power law regularization can be applied to reduce the effects of peaky components: $H_{c_p}[i]=H_c[i]^\alpha$. Here, the exponent alpha typically lies in the range (0, 1). Values closer to 0 reduce the relative importance of peaky components more aggressively.

In some implementations, a more compact frame signature can be created through the following example process. The power law regularized histogram $[H_{red_p}, H_{green_p}, H_{blue_p}]$, which is a 3N-dimensional vector of numbers, can already be used for clustering. However, since the memory usage and computational costs of maintaining the online clusters is proportional to the frame signature's number of dimensions, the number of dimensions can be reduced to conserve memory and computation.

As such, in some implementations, a special form of principal component analysis (PCA) can be applied to reduce the signature dimensionality. Specifically, the PCA transform's parameters can themselves be made to be memory efficient, to avoid having to store a large model on a device with limited memory.

First, the PCA model can be trained by (1) estimating the mean signature amongst a set of training signatures, (2) subtracting the mean signature from every training signature, (3) forming the covariance matrix from the set of mean-subtracted training signatures, (4) calculating the eigenvectors of this covariance matrix, and (5) keeping only the 128 eigenvectors with the largest eigenvalues.

Figure 6:
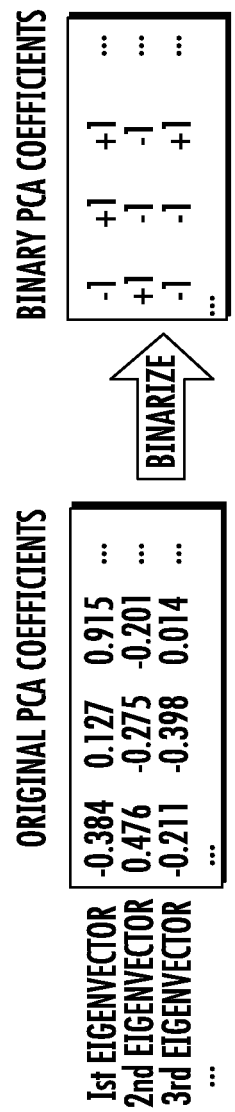
FIG. 6 depicts a graphical diagram of an example binary coefficient process according to example embodiments of the present disclosure.

Next, the PCA model can be converted into a memory-efficient representation by binarizing the eigenvectors into +1 or −1 based on the sign. Let E[j][i] (i=0, , 3N−1) represent the jth eigenvector of the covariance matrix. Then, the jth binary eigenvector B[j][i]=sign(E[j][i]) (i=0, , 3N−1). The binary representation actually enables encoding of any 32 PCA coefficients into a single 32-bit integer in memory, which reduces the memory usage compared to the original floating point PCA by 32 times. The binary PCA model also enables calculation of the inner products between the PCA eigenvectors and new frame signatures by simple additions and subtractions alone without multiplications. The binary PCA transform can be stored in ~6 KB of memory, whereas the non-binary PCA transform requires ~192 KB. An example illustration of the binarization process is provided in FIG. 6.

With the binary PCA model, the new frame signature is computed as F[j] (j=0, , 127) where the jth coefficient F[j] is the inner product between the RGB histogram $[H_{red_p}, H_{green_p}, H_{blue_p}]$ and the jth binary eigenvector B[j]. The vector F can be further normalized to have unit Euclidean magnitude.

In some implementations, alternatively or additionally to use of the color histograms, 3A statistics can be used by the frame signature generator 506 to generate the frame signatures. For example, a same or similar process as described above can be applied to the 3A statistics in addition or alternatively to the RGB histograms. In one particular example, the frame signature generator 506 can generate the lightweight frame signatures based on patch sums from the 3A statistics (e.g., auto exposure patch sums).

Referring still to FIG. 5, in some implementations, the online clusterer 502 can form and/or update online clusters for a sequence of frame signatures. The similarity calculator 508 can determine a distance or other similarity metric between given pair(s) of frame signatures.

In some implementations, prior to clustering, the sequence of signatures can be temporally smoothed using a low-pass, causal filter. For example, the filter can be as follows: smoothed_signature[t]=smoothing_weight*smoothed_signature[t−1]+(1−smoothing_weight)*new_signature[t]. Here, the smoothing_weight is a bilateral weight that depends on (a) the difference between the previous signature and the current signature's timestamps and/or (b) the Euclidean distance between the previous signature and the current signature. When the timestamp difference or the Euclidean distance increases, the weight decreases toward 0. The weight is maximal at value 1 when the timestamp difference and Euclidean distance are both 0. Temporal smoothing helps reduces noise that naturally exists in the hardware imaging statistics by exploiting the temporal correlation between neighboring frames.

After temporal smoothing of the input signature sequence, the core online clustering algorithm can take different implementations, including the following examples.

Incremental K-means Quantizer:

Process the sequence of frames in batches. When the current batch size $N_{batch}$ reaches a certain threshold (e.g., $N_{batch}$=a few hundred), compute the mean M of all the frame signatures in the batch. Find the closest cluster centroid C to $M_{batch}$, where closeness can be measured in terms of Euclidean distance between the vectors $M_{batch}$ and C. Let N(C) be the number of frame signatures previously assigned to the cluster for centroid C. If distance($M_{batch}$, C) is below a threshold $T_{dist}$, merge the batch with the cluster by updating C:=$N_{batch}$/(N(C)+$N_{batch}$)*$M_{batch}$+N(C)/(N(C)+$N_{batch}$)*C and N(C):=N(C)+$N_{batch}$. Otherwise, if distance($M_{batch}$,C) is above a threshold $T_{dist}$, create a new cluster with $M_{batch}$ as the new centroid.

Tree-Structured Vector Quantizer:

The cluster centroids are maintained as the numbers of a multilevel tree. When a new frame signature F arrives, propagate the signature down the tree with a greedy search algorithm. Upon reaching a leaf node, consider the distance between the leaf node C and the frame signature F. If distance(F,C) is below a threshold $T_{dist}$, update the leaf node as C:=1/(N(C)+1)*F+N(C)/(N(C)+1)*C and the corresponding counter as N(C):=N(C)+1. Otherwise, if distance(F,C) is above a threshold $T_{dist}$, attach the frame signature F as a new child node of C.

In some implementations, a novelty score can be generated according to the following example process. For a given set of K online cluster centroids {C[1], C[2], , C[K]}, a novelty score for a new frame signature F can be computed in different ways, including the following examples.

New Cluster Formation:

If the frame signature F results in the formation of a new cluster centroid, assign a score of Novelty(F)=1 to the frame. Otherwise, assign a score of Novelty(F)=0. The formation of a new cluster implies the new frame looks different than previously observed frames, so its novelty should be rewarded by giving a positive score. Conversely, if a new cluster is not formed, it implies the new frame looks similar to previous frames and should not be rewarded in terms of novelty.

Distance to Closest Cluster:

Alternatively, consider the distance between the frame signature F and the closest cluster centroid C. Form the novelty score as Novelty(F)=1−exp(distance(F,C)/$decay_{factor}$). When the distance is small, it implies the frame looks similar to previously observed frames, and the novelty score is close to 0. Oppositely, if the distance is large, it implies the frame looks dissimilar from previously observed frames, and the novelty score is close to 1.

The novelty score assigned to an image can be used as the diversity metric for the image.

Referring again to FIG. 1, as one example downstream operation 40, a controller 125 can use the novelty score/diversity metric 30 to decide when to save a new image (e.g., a new burst of frames). As an example, in some implementations, the controller 125 can incorporate the novelty score for frame F into a weighted sum with other quality and saliency scores, such as the following example: Score(F)= alpha*Face_Quality(F)+beta*Content_Saliency(F)+ gamma*Novelty(F). Here, alpha, beta, and gamma are some positive constants which control the relative contributions of the face quality (e.g., how much a person is smiling), content saliency (e.g., how likely the frame shows some interesting objects), and novelty components in the weighted sum. When Score (F) exceeds a threshold, the controller 125 can decide to save the frame or burst of frames. Without the novelty term in the weighted sum, frames or bursts of frames would be saved if the face quality and content saliency score is high. However, with the inclusion of the novelty term, the probability of saving frames when their novelty factor is high can be increased, as long as the frames also contribute some minimal face quality and content saliency factors.

The novelty term can also be used for submodular optimization in the curation stage, where a certain number (e.g., 20) of the best images or bursts of images are selected out of all available saved images to show the user. For example, each burst B can be scored in terms of a weighted sum Score(B)=alpha*Face_Quality(B)+beta*Content_Saliency(B)+gamma*Novelty(B), where the constant multipliers alpha, beta, and gamma are generally different from the aforementioned constants used for selecting which bursts to save. By incorporating Novelty(B) into the optimization, a set of bursts can be naturally selected where the elements look different from each other. This helps avoid selecting all the bursts from a single scene where face quality and content saliency may be higher. Given that some bursts already cover a scene, the marginal value of showing more bursts from the same scene diminishes. Then, it is actually a better use of the budget (transmission time, device storage, etc.) to show some bursts from completely different scenes spanning the user's entire experience.

Thus, as example uses, on an intelligent mobile image capture device, the lightweight content diversity metric can be used to improve both (1) online burst saving, by giving more emphasis to not well-understood but interesting content that was not saved before and (2) offline burst curation, by increasing the overall diversity amongst the final set presented to the user. Beyond this particular example context, any system or product that needs to increase diversity among a set of images or videos can benefit from the diversity technique described herein. This can include any camera-equipped mobile device running any scene analysis and frame selection. Hardware-generated statistics that are typically generated already for auto white balance and auto exposure are leveraged and should be widely available on most cameras. The frame signatures and derived score functions are very efficient to calculate on a general purpose CPU. The technique is also not tied to any object model and should work generically in any scene.

Referring still to FIG. 1, another example signal or metric 30 that can be computed by the lightweight analyses described herein is an image/video quality metric. In particular, an analyzer 123 can determine the image quality metric based at least in part on a number of different features and/or statistics 20. Example features and statistics 20 that can be used to compute an image quality metric for an image include: RGB color histograms, luma histogram(s), auto white balance statistics, auto focus statistics, and/or auto exposure statistics. Typically these statistics 20 are available from the hardware blocks 122 in the imaging pipeline 119.

Additional example features that can be used to compute the image quality metric include imaging pipeline settings, including exposure time, analog gain and digital gain. The exposure time is the length of time that the camera sensor is exposed to light. The analog and digital gains are computed by an auto exposure algorithm to adjust the brightness of an image, such that it matches to an expected level of brightness.

Additional example features that can be used to compute the image quality metric include camera motion, which may be provided by data from one or more inertial measurement units (IMUs). More specifically, in some implementations, the angular velocity can be used for the image quality metric.

In some implementations, the image quality can be characterized by one or more different signals, including, for example: 1) auto exposure stability; 2) image blurriness; 3) noise level; and/or 4) a generic logistic image quality score correlated with over/under exposure, low contrast, and/or hand blockage.

1) Auto exposure stability signal: Auto exposure instability is likely to happen when there is a change of capture frame rate. This leads to undesirable brightness fluctuations of video frames. To detect frames that have unstable auto exposure and subsequently filter them out, the present disclosure provides three example techniques: 1) The luma histogram of a current frame can be compared to that of the previous frame. If the sum of differences between the two luma histograms exceeds a certain threshold, the frame is declared as an auto exposure unstable frame. 2) The logistic image quality score (described in further detail below) of the current frame is compared to that of the previous frame. If the logistic image quality score difference exceeds a certain margin, the frame is declared as an auto exposure unstable frame. 3) After applying auto exposure, the brightness of the current frame is compared to that of the previous frame. If the percentage of brightness change exceeds a certain threshold, the frame is declared as having unstable auto exposure.

2) Image blurriness signal: For an image capture device that is mobile or able to be worn, image blur is often caused by motion of the device. In some implementations, the following can be used to compute the amount of camera motion during frame capture and characterize the image blurriness:

Blurriness=Exposure time×IMU angular velocity

3) Level of noise: Image noise is heavily correlated with the total gain applied to the image. As such, the total gain can be used as a measure of noise level. For example, noise level can be calculated as follows:

Noise level=Analog gain×Digital gain

4) Logistic image quality score: For each frame, an image quality score can be computed by logistic regression. The RGB histogram, luma histogram, auto white balance statistics, and/or auto focus statistics can be collected from the hardware block. In the interest of fast computation and to avoid model overfitting, these hardware features can be summarized into a set of statistics, including percentiles at 25%, 50% and 75%, percentage of oversaturated and undersaturated pixels, entropy, inter quartile range, standard deviation, skewness, and/or kurtosis. These summary statistics are fed to a pre-trained logistic regression model to estimate the image quality of the frame.

The aforementioned techniques provide a lightweight approach in computing a set of image quality metrics at extremely low computational cost. A central idea to the present disclosure is the use of the readily available hardware statistics, imaging pipeline settings, and readings collected from other sensors like IMU. Conventionally, imaging pipeline statistics and settings are used for processing image sensor raw data to generate better looking images, while the IMU data is used to measure device acceleration and orientation. These features have not been utilized for computing image quality, since prior works on image quality analysis focus on inferring image quality from the images themselves, rather than using cheap features from hardware statistics, imaging pipeline settings, and IMU.

Another interesting aspect of the present disclosure is the use of a lightweight algorithm before more heavy weight machine intelligence algorithms. The lightweight algorithm is used as a gateway to prevent the system from wasting power and computation on poor image quality frames that are hopeless.

As examples, two alternative example implementations of these concepts are as follows.

1) One example implementation of the image quality estimation algorithm is based on the Movidius Myriad 2 series image processor. For other kinds of image processors, a different set of hardware statistics may be provided. Thus, it is feasible to retrain the logistic regression model using other types of statistics from the imaging pipeline.

2) Another example implementation of the generic image quality score is based on logistic regression, which is trained using binary good/bad image labels. Other machine learning methods may be used. For example, when image quality scores are labeled on a set of images, one can train linear regression model instead of the logistic regression model as used in our implementation.

Example uses of the image quality metrics 30 by one or more controllers 125 include the following:

1) Rejecting unstable exposure frames: As an example, in a low-power state, an example intelligent mobile image capture device can capture one frame per second to save power. When interesting content like faces, pets, or landmarks is detected, the frame rate is increased to 15 frames per second to record a burst of images. Changing the frame rate causes auto exposure instability, resulting in fluctuations in the brightness level for the first few frames of the burst. To resolve this issue, a controller 125 can use the proposed auto exposure stability signal to exclude the frames that have fluctuating exposure from being included in a burst video generated from the burst of images.

2) Rejecting poor image quality frames: For each frame, a controller 125 can combine all the image quality metrics to judge whether the frame is worth keeping for further image analysis. Only those frames that yield reasonable image quality are then passed on to more computationally intensive machine intelligence tasks such as face detection and object detection.

3) Improving hyperlapse frame selection: During hyperlapse, a controller 125 selects one frame out of several frames for inclusion in a video summary of an event such as walking and biking. Conventionally, hyperlapse considers camera motion (e.g., as indicated by IMU data) over time and select frames that give a smooth motion trajectory. Some researchers also consider image quality metrics such as motion blur estimated from the actual image itself. However, different from these methods, the present disclosure incorporates the image quality metrics described above (which are computed from readily available imaging pipeline settings, hardware-generated statistics, and IMU reading) to improve hyperlapse frame selection. Example techniques by which these image quality metrics can be used include: 1) The image blurriness signal can be used to penalize frames that have high blurriness; 2) The auto exposure stability can be employed to select frames that have consistent exposure values. For example, the logistic image quality score can be used to compute auto exposure stability.

As an example, the image quality metrics can be used in on on-device machine intelligence, including smartphones, wearables, and smart appliances (such as surveillance camera). As another example, for any device that involves machine intelligence for image analysis, the image quality metrics can be used for frame filtering or frame selection.

Referring still to FIG. 1, another example metric 30 that can be calculated by the analyzers 123 is a motion saliency metric. In particular, an analyzer 123 can determine the motion saliency metric based on one or more input features.

An important aspect that makes the motion saliency algorithm described herein ultra-lightweight is the utilization of features directly coming from the imaging hardware pipeline 119. In almost all cameras, auto white balance statistics and auto focus statistics are collected, which allow the camera to perform auto white balance and auto focus.

Typically, these statistics are collected by dividing the image into patches, where the statistics are aggregated for each patch. For example, in the Movidius Myriad 2 chip, the auto white balance statistics contain the sums of raw pixel values within each patch, while the auto focus statistics contain the sums of bandpass filtered response within each patch. In other words, the auto white balance and auto focus statistics can be treated as a coarse representation of the frame.

In some implementations, to make auto white balance statistics more robust towards camera exposure settings, the auto white balance statistics can be optionally normalized by dividing the product of exposure time and gain. This normalization step makes the auto white balance statistics invariant to the camera exposure changes between frames.

In some implementations, in the interest of computation efficiency, only the auto white balance statistics are used to compute the motion saliency. However, in other implementations, auto focus statistics are used for motion saliency computation. In yet further implementations, a combination of auto white balance and auto focus statistics can be used for motion saliency computation. Thus, while auto white balance statistics will be discussed in detail below, the motion saliency technique can also be applied to auto focus statistics and/or a combination of auto white balance and auto focus statistics.

For every two consecutive frames, an analyzer 123 can compute a motion saliency metric which measures the amount of discrepancy between local and global camera motion. In some implementations, the analyzer 123 can compute the motion saliency metric in three steps: 1) Local motion estimation; 2) Global motion estimation; 3) Motion difference computation.

1) Local Motion Estimation:

An objective of local motion estimation is to compute dense motion vectors between two frames. Different from other motion estimation techniques that take actual images as input, a central aspect of the techniques described herein is to perform motion estimation using the statistics (e.g., auto white balance statistics) from the imaging pipeline. The analyzer 123 can use a hierarchical coarse-to-fine approach for motion estimation. See, e.g., Bouguet, "Pyramidal implementation of the affine Lucas-Kanade feature tracker description of the algorithm." Intel Corporation 5.1-10, 2001.

For each frame, the analyzer 123 can construct an image pyramid by repeatedly sub sampling its auto white balance statistics by a factor of two in both the horizontal and vertical directions. The original auto white balance statistics is referred as the finest level, while sub sampled versions of the original auto white balance statistics constitute the coarser levels of the pyramid. Motion estimation can then be iteratively performed in the order of coarse level to fine level.

In the interest of better motion estimation accuracy while keeping computation at low cost, two classical optical flow methods can be combined: the Horn-Schunck method (B. K. P. Horn and B. G. Schunck, "Determining optical flow." Artificial Intelligence, vol 17, pp 185203, 1981) and the Lucas-Kanade method (B. D. Lucas and T. Kanade, "An iterative image registration technique with an application to stereo vision". Proceedings of Imaging Understanding Workshop, pp 121-130, 1981). In particular, the computationally expensive Horn-Schunck method can be applied on the coarse levels, where the amount of data to be processed is low since the auto white balance statistics are subsampled.

At finer pyramid levels, the more computationally efficient Lucas-Kanade method can be employed, which further refines the motion vectors in order to capture local motion. When performing Lucas-Kanade optical flow, the two eigenvalues of the Lucas-Kanade Hessian matrix can be examined, and, in some implementations, the optical flow can be computed only when the following criteria are fulfilled: 1) The smaller eigenvalue exceeds a threshold, suggesting that the motion is not estimated on a flat region; and 2) The ratio between the larger and smaller eigenvalues is less than a threshold, indicating that the region does not only contain an edge (which is known as the aperture problem).

The end result of local motion estimation is a set of motion vectors estimated densely over the image. Assuming there are M×N patches of auto white balance statistics, M×N local motion vectors can be computed.

2) Global Motion Estimation:

Once the local motion is obtained, the analyzer 123 can estimate a 6-parameter affine model that describes the amount of global motion between the two frames. The affine model can be estimated by minimizing the mean squared errors between the estimated global and local motion vectors. The global motion vectors can be computed at each patch using the estimated affine model.

3) Motion Saliency Computation:

The motion saliency metric measures the amount of discrepancy between local and global motion. When there is a large local-global motion difference, it suggests that the image capture device has observed local object motion that is different from global motion. Thus, the present disclosure provides a motion saliency metric which can be computed as the average of Euclidean distances between local and global motions, divided by the mean of global motion magnitude over the image.

Example uses of the motion saliency by one or more controllers 125 include the following:

When the estimated motion saliency metric is higher than a certain threshold, a controller 125 can trigger the image capture to capture a burst of frames as the content is likely to be interesting.

Over a period of time, if the image capture device has not captured a burst of frames, the device can more aggressively look for interesting content to capture (e.g., by changing thresholds for burst capture). The motion saliency metric can be used as an important signal to suggest that something interesting has happened and trigger camera capture.

A controller 125 can also use the motion saliency metric to perform auto trimming of a burst. Users generally prefer moments that contain object motions. Therefore, when motion saliency goes from a lower to higher, it suggests the start of a burst. Similarly, when motion saliency goes from high to low, it suggests the end of a burst.

The motion saliency metric is also applicable to on-device machine intelligence, including smartphones, devices that are able to be worn, and/or smart appliances (e.g., a surveillance camera). The motion saliency metric can be used for frame filtering or frame selection for any imaging device that involves motion analysis of the scene.

Figure 7:
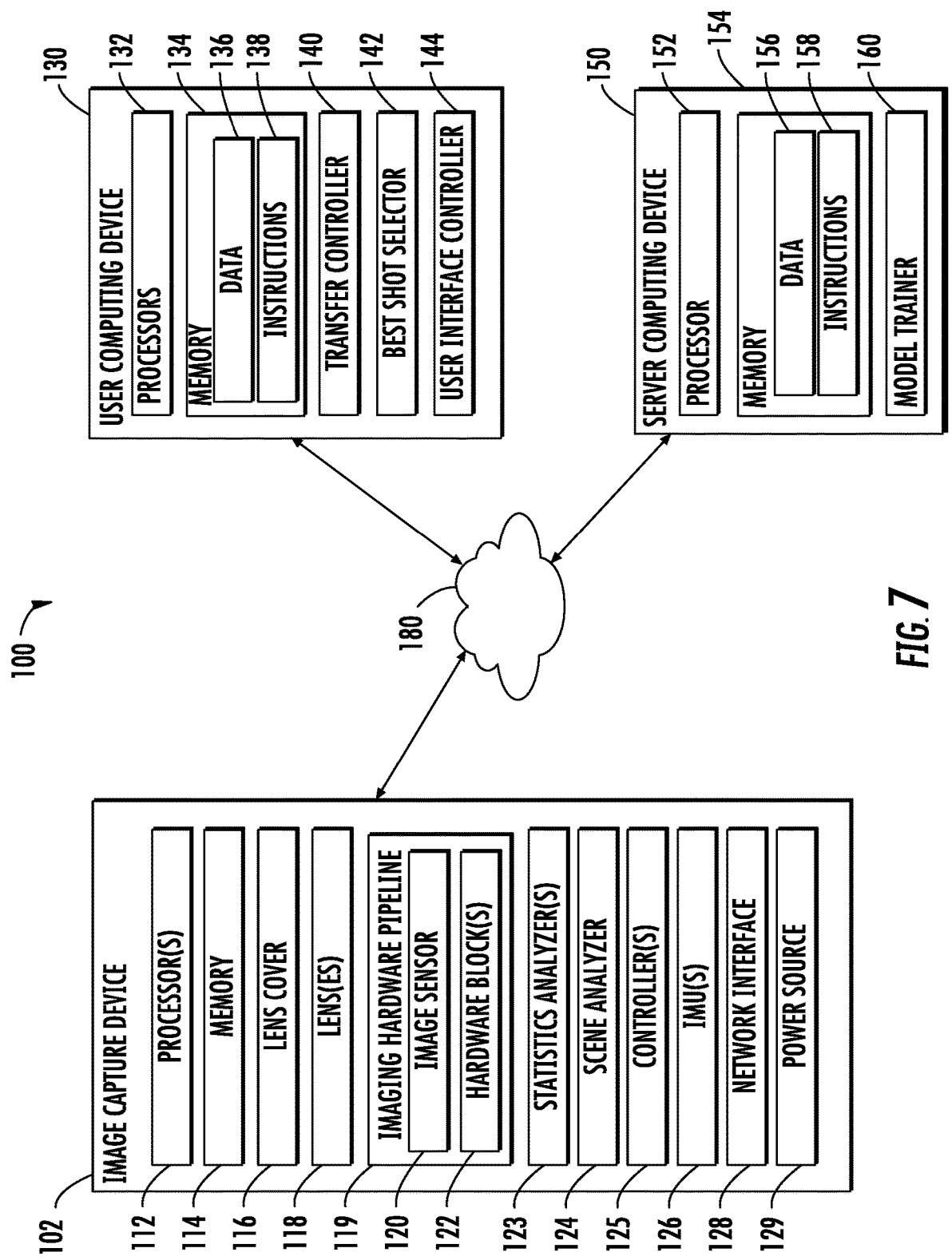
FIG. 7 depicts a block diagram of an example computing system according to example embodiments of the present disclosure.

FIG. 7 depicts an example image capture, curation, and editing system 100 according to an example embodiment of the present disclosure. The system 100 is provided as one example system only. The systems, methods, techniques, and principles of the present disclosure can be used in and applied to many different systems in addition to the example system 100.

The system 100 includes at least one image capture device 102 and a user computing device 130. The image capture device 102 can be mobile and/or able to be worn. The system 100 may also include one or more additional image capture devices and/or a server computing device 150.

The image capture device 102 includes one or more processors 112 and a memory 114. The one or more processors 112 can be any suitable processing device and can be one processor or a plurality of processors that are operatively connected. In some implementations, the processor 112 includes a dedicated vision processing platform that delivers high-performance machine vision and visual awareness in a power-constrained environment. For example, the processor 112 can be a system-on-a-chip (SoC) designed for high-performance, low-power computational imaging. In some implementations, the processor 112 includes hardware, software, and/or firmware that is selectively usable to perform a complete image processing pipeline on-chip. In some implementations, the processor 112 includes multiple vector processors optimized for vision processing workloads.

The memory 114 can include one or more non-transitory computer-readable mediums, such as RAM, ROM, EEPROM, EPROM, flash memory devices, magnetic disks, etc., and combinations thereof. In some example implementations, the memory 114 includes at least a first volatile (e.g., DRAM) memory and a second non-volatile memory. For example, the first volatile memory can be used for temporary storage of various types of image data, while the second non-volatile memory can be used for non-temporary storage of various types of image data. For example, the first volatile memory can include a temporary image buffer. In some implementations, the non-volatile memory includes a flash memory card. In some implementations, the flash memory card is a Secure Digital (SD) card.

The example image capture device 102 can also include a lens cover 116, one or more lenses 118, and an image sensor 120. The image sensor 120 can be a sensor that detects incoming light or other electromagnetic radiation and outputs data sufficient to generate an image of a scene. For example, the image sensor 120 can be a CMOS sensor or a CCD sensor. In some implementations, the one or more lenses 118 can include a wide angle lens such that images resulting from data output by the image sensor 120 are wide angle images.

As noted above, the image sensor 120 can output data sufficient to generate images of a scene viewed by the image sensor 120. The image capture device 102 can include various additional components for processing such data from the image sensor 120 to generate such images. As one example, the image capture device 102 can include one or more hardware blocks 122. The hardware blocks 122 can include one or more image processing components that are operable to process the raw data from the image sensor 122 form images.

According to another aspect of the present disclosure, the image capture device 102 further includes a scene analyzer 124. In some implementations, the scene analyzer 124 is operable to analyze a scene depicted by an image captured by the image capture device 102 to assess a desirability of such scene and, based at least in part on such desirability, determine whether to store such image and/or one or more other contemporaneously captured images or to discard such image and/or one or more other images without further storage. In some implementations, the scene analyzer 124 includes one or more neural networks, such as deep neural networks, convolutional neural networks, or other multi-layer non-linear models which output descriptors of the desirability of the scene of an input image. In addition, in some implementations, the scene analyzer 124 can also make control decisions regarding the capture mode of the image capture device 102 (e.g., based on the desirability of a depicted scene).

The image capture device 102 can further include one or more inertial measurement units (IMUs) 126. The inertial measurement units 126 can be electronic devices that measure and report one or more of a velocity, and orientation, and gravitational forces applied to or otherwise associated with the image capture device 102. For example, the inertial measurement units 126 can include one or more accelerometers, gyroscopes, and/or magnetometers. In some implementations, data from the one or more inertial measurement units 126 can be appended to an image captured around the time such data was generated by the inertial measurement units 126. Thus, for example, an image captured by the image capture device 102 can have as associated metadata the information provided by the inertial measurement units 126 at the time of capture. Such information can be usable by downstream processes, for example, in selecting (or rejecting) particular images due to blur, motion, or other undesirable attributes attributable to unintended movement, jostling, or other physical disturbance of the image capture device (e.g., physical disturbance resultant from a user's gait). Thus, image capture timing can be based on data from IMUs 126.

The image capture device 102 further includes a network interface 128. The network interface 128 can include any number of components to provide networked communications (e.g., transceivers, antennas, controllers, cards, etc.). In some implementations, the image capture device 102 includes a first network interface operable to communicate using a short-range wireless protocol, such as, for example, Bluetooth and/or Bluetooth Low Energy, and also a second network interface operable to communicate using other wireless network protocols, such as, for example, Wi-Fi. In one example, the image capture devices are operable to communicate with each other using a short-range wireless protocol, such as Bluetooth Low Energy. Further, the image capture device 102 can be operable to communicate with the user computing device 130 using either the short-range wireless protocol (e.g., to transmit capture visualizations) or Wi-Fi or other more robust networking protocols (e.g., for the transfer of captured images).

The image capture device 102 can further include a power source 129. As one example, the power source 129 can be an on-board battery, such as an on-board lithium-ion battery. The image capture device 102 can also be electrically connectable (e.g., via a micro USB port or other electrical and/or data connection port) to a wall outlet or other source of utility power or other appropriately rated power. Plugging the image capture device 102 into a wall outlet can recharge the on-board battery. In some implementations, the image capture device 102 is configured to transfer images to the user computing device 130 over network 180 or perform other highly energy consumptive tasks only when the image capture device 102 is connected to an external power source, such as a wall outlet.

The system 100 can further include the user computing device 130 and the server computing device 150. In some implementations, the image capture device 102 communicatively connects to the user computing device 130 over a local area network portion of network 180, while the user computing device 130 communicatively connects to the server computing device 150 over a wide area network portion of the network 180. In other implementations, the image capture device 102 communicatively connects to the server computing device 150 directly over the wide area network.

In some implementations, the user computing device 130 can perform image curation and enable user editing of the images. In particular, in some implementations, when connected to the image capture device 102 (e.g., after a capture session has been completed), the user computing device 130 can select certain of the images stored at the image capture device for transfer to the user computing device 130. The user computing device 130 can also provide a user interface that enables the user to selectively edit the transferred images. In particular, the user interface can enable various advanced image editing techniques such as computational photography, camera repositioning, etc.

User computing device 130 can be, for example, a computing device having a processor 132 and a memory 134, such as a wireless mobile device, a personal digital assistant (PDA), smartphone, tablet, laptop, desktop computer, computing-enabled watch, computing-enabled eyeglasses, or other such devices/systems. In short, user computing device 130 can be any computer, device, or system that can interact with the image capture device 102 and (e.g., by sending and receiving data) to implement the present disclosure.

Processor 132 of user computing device 130 can be any suitable processing device and can be one processor or a plurality of processors that are operatively connected. Memory 134 can include any number of computer-readable instructions 138 or other stored data 136. In particular, the instructions 138 stored in memory 134 can include one or more applications. When implemented by processor 132, the one or more applications can respectively cause or instruct processor 132 to perform operations consistent with the present disclosure, such as, for example, executing an image storage, curation, editing, and sharing application. Memory 134 can also store any number of images captured by the image capture device 102 and/or the user computing device 130.

User computing device 130 can further include a display. The display can be any one of many different technologies for displaying information to a user, including touch-sensitive display technologies.

In some implementations, the user computing device 130 also includes a transfer controller 140. In particular, in some implementations, when connected to the image capture device 102 (e.g., after a capture session has been completed), the transfer controller 140 can select certain of the images stored at the image capture device 102 for transfer to the user computing device 130. For example, such selection can be guided by various image attributes as reflected in various metadata annotations provided by the image capture device 102 respectively for the stored images. Generally, the most desirable images will be selected for transfer, while maintaining a diversity of imagery.

In some implementations, the transfer controller 140 can perform an optimization algorithm to select which of the images stored in the memory 114 of the image capture device 102 to request for transfer. The optimization algorithm can have a plurality of associated objectives which include, for example, at least a diversity of settings and a diversity of depicted persons, while still requesting transfer of the most desirable images. In some implementations, the transfer controller 140 can implement a submodular function to select which images to request for transfer. In some implementations, the transfer controller 140 can consider one or more metrics generated for an image from hardware-generated statistics.

In some implementations, the user computing device 130 further includes a best shot selector 142. The best shot selector 142 can be implemented to select at least one highlight image from a group of images (e.g., at least one highlight image for each moment within a reflection). For example, the best shot selector 142 can select the highlight images based on the annotations or other metadata included for each of the images. In some implementations, the best shot selector 142 normalizes each image in a moment relative to its peer images within such moment prior to performing highlight selection. Thus, selection of a highlight image for each moment can be based at least in part on a comparison of the annotations of each image included in such moment relative to the annotations of at least one other image included in such moment. In some implementations, the best shot selector 142 can consider one or more metrics generated for an image from hardware-generated statistics.

The user computing device 130 also includes a user interface controller 144. The user interface controller 144 can be implemented to provide a user interface that enables the user to temporally and/or spatially explore images within a reflection. In particular, the user interface controller 144 can be implemented to detect and respond to certain user input with appropriate user interface interactions.

Each of the transfer controller 140, the best shot selector 142, and the user interface controller 144 can include computer logic utilized to provide desired functionality. Thus, each of the transfer controller 140, the best shot selector 142, and the user interface controller 144 can be implemented in hardware, firmware and/or software controlling a general purpose processor. In some implementations, each of the transfer controller 140, the best shot selector 142, and the user interface controller 144 includes program code files stored on the storage device, loaded into memory 134 and executed by processor 132 or can be provided from computer program products, for example, computer executable instructions 138 that are stored in a tangible computer-readable storage medium such as, for example, a RAM disk or card or other computer-readable optical or magnetic media.

Server computing device 150 can be implemented using one or more server computing devices and can include a processor 152 and a memory 154. In the instance that server computing device 150 consists of multiple server devices, such server devices can operate according to any computing architecture, including a parallel computing architecture, a distributed computing architecture, or combinations thereof.

Processor 152 can be any suitable processing device and can be one processor or a plurality of processors which are operatively connected. Memory 154 can store instructions 158 that cause processor 152 to perform operations to implement the present disclosure.

Server computing device 150 can also include a model trainer 160. Server computing device 150 can implement the model trainer 160 to train and/or re-train one or more models (e.g., neural networks) such as multi-layer non-linear models (e.g., deep neural networks). As examples, the model trainer 160 can perform back propagation techniques such as batch gradient descent or stochastic gradient descent to train the models. The model trainer 160 can also leverage dropout techniques to combat model overfitting. The model trainer 160 can train models using processed images and/or unprocessed images as training images.

Thus, in some implementations, the server computing device 150 can implement model trainer 160 to train new models or update versions on existing models on additional image data. As an example, the model trainer 160 can use images hand-labeled as being desirable to train one or more models to provide outputs regarding the desirability of an input image. In particular, in some implementations, the additional training data can be images that the user created through the editing interface. Thus, updated versions of the models of the image capture device 102 can be trained by model trainer 160 on personalized data sets to better infer, capture, and store images which satisfy the particular visual tastes of the user. In other instances, the additional training data can be anonymized, aggregated user feedback.

The server computing device 150 can periodically provide the image capture device 102 with one or more updated versions of one or more models included in the scene analyzer 124 or analyzers 123. The updated models can be transmitted via the user computing device 130 or directly to the image capture device 102 via network 180. In other implementations, the user computing device 130 can also include a model trainer that performs personalized model training as described above for a particular image capture device 102.

The model trainer 160 can include computer logic utilized to provide desired functionality. Thus, the model trainer 160 can be implemented in hardware, firmware and/or software controlling a general purpose processor. In some implementations, the model trainer 160 includes program code files stored on the storage device, loaded into memory 154 and executed by processor 152 or can be provided from computer program products, for example, computer executable instructions that are stored in a tangible computer-readable storage medium such as RAM hard disk or card or other computer-readable optical or magnetic media.

Network 180 can be any type of communications network, such as a local area network (e.g., intranet), wide area network (e.g., Internet), or some combination thereof and can include any number of wired or wireless links. In general, communication between the server computing device 150 and the user computing device 130 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with user computing device 130 over network 180 by sending and receiving data.

Further, any of the processes, operations, programs, applications, or instructions described as being stored at or performed by the server computing device 150 can instead be stored at or performed by the user computing device 130 in whole or in part, and vice versa. In particular, in some implementations, the image capture device 102 can directly communicatively connect to the server computing device 150 and the server computing device 150 can perform the image curation, editing, storage, and sharing functions attributed to the user computing device 130 elsewhere in the present disclosure (e.g., via a web application). Likewise, any of the processes, operations, programs, applications, or instructions described as being stored at or performed by the image capture device 102 can instead be stored at or performed by the user computing device 130 in whole or in part, and vice versa. For example, in some implementations, the transfer controller 140 can be located at the image capture device 102 rather than the user computing device 130.

Figure 8:
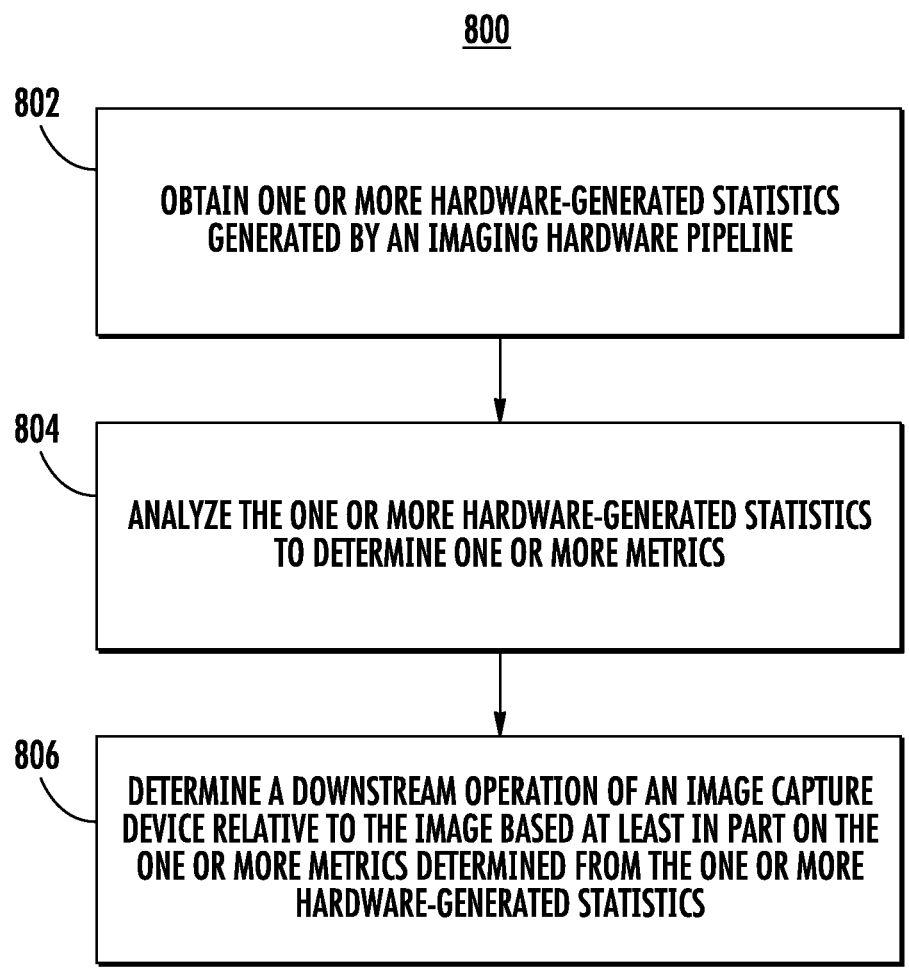
FIG. 8 depicts a flow chart diagram of an example method to control an image capture device according to example embodiments of the present disclosure.

FIG. 8 depicts a flow chart diagram of an example method 800 to control an image capture device according to example embodiments of the present disclosure.

At 802, a computing system obtains one or more hardware-generated statistics generated by an imaging hardware pipeline. For example, the imaging hardware pipeline can include an image sensor that is operable to capture raw image data and one or more hardware blocks that are operable to process the raw image data to contribute to formation of an image.

As examples, in some implementations, the one or more hardware-generated statistics generated by the imaging hardware pipeline can include one or more of: a red color histogram; a blue color histogram; a green color histogram; a luma histogram; auto white balance statistics; auto focus statistics; auto exposure statistics; one or more image thumbnails; and a high-frequency map.

At 804, the computing system analyzes the one or more hardware-generated statistics to determine one or more metrics for the raw image data or the image.

In some implementations, analyzing the one or more hardware-generated statistics at 804 to determine the one or more metrics can include determining a temporal similarity metric for the image relative to at least one previously captured image based at least in part on the one or more hardware-generated statistics.

In some implementations determining the temporal similarity metric for the image can include determining the temporal similarity metric for the image relative to at least one previously captured image based at least in part on the at least one of: auto exposure statistics, auto focus statistics, auto white balance statistics, a red color histogram, a blue color histogram, and a green color histogram.

In some implementations, analyzing the one or more hardware-generated statistics at 804 to determine the one or more metrics can include determining a diversity metric for the image relative to at least one previously captured image based at least in part on the one or more hardware-generated statistics.

In some implementations, determining the diversity metric for the image can include generating a frame signature for the image based at least in part on at least one of: auto exposure statistics, auto focus statistics, auto white balance statistics, a red color histogram, a blue color histogram, and a green color histogram; and comparing the frame signature for the image to a plurality of existing frame signature clusters to determine the diversity metric for the image.

In some implementations, analyzing the one or more hardware-generated statistics at 804 to determine the one or more metrics can include determining an image/video quality metric for the image based at least in part on the one or more hardware-generated statistics.

In some implementations, analyzing the one or more hardware-generated statistics at 804 to determine the one or more metrics can include determining a motion saliency metric for the image based at least in part on the one or more hardware-generated statistics.

In some implementations, determining the image/video quality metric for the image based at least in part on the one or more hardware-generated statistics can include inputting data descriptive of the one or more hardware-generated statistics into a machine-learned regression model and receiving a quality score for the image as an output of the machine-learned regression model.

At 806, the computing system determines a downstream operation of the computing system relative to the image based at least in part on the one or more metrics determined from the hardware-generated statistics. For example, the downstream operation can be a post-processing operation that is performed by the system subsequent to formation of the image by the imaging hardware pipeline.

In some implementations, determining the downstream operation based at least in part on the one or more metrics at 806 can include determining, based at least in part on the one or more metrics determined from the hardware-generated statistics, whether to store a non-temporary copy of the image in a non-volatile memory or whether to discard a temporary copy of the image stored in a volatile memory without storing the non-temporary copy of the image in the non-volatile memory.

In some implementations, determining the downstream operation based at least in part on the one or more metrics at 806 can include determining whether to provide the image to a neural network for scene analysis based at least in part on the one or more metrics determined from the hardware-generated statistics.

In some implementations, determining the downstream operation based at least in part on the one or more metrics at 806 can include determining, based at least in part on the one or more metrics determined from the hardware-generated statistics, whether to select the image for inclusion in a hyperlapse video or a burst video.

In some implementations, determining the downstream operation based at least in part on the one or more metrics at 806 can include determining, based at least in part on the one or more metrics determined from the hardware-generated statistics, whether to select the image for inclusion in a curated summary of an image collection.

In some implementations, determining the downstream operation based at least in part on the one or more metrics at 806 can include adjusting, based at least in part on a temporal similarity metric determined for the image relative to the at least one previously captured image, a frequency of usage of a neural network that analyzes a scene depicted by the image.

In some implementations, the method 800 can further include determining, based at least in part on the one or more metrics determined from the hardware-generated statistics, whether to capture additional images that depict a same scene as the image. For example a frame rate, resolution, or other parameters of the image sensor can be increased.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Any action, operation, component, method, technique, or other aspect described herein as being included in or performed by an image capture device can also be included in or performed by a device or system that does not capture images but instead simply processes images or makes decisions on the basis of images.

Although the figures depict steps or processes performed in a particular order for purposes of illustration and discussion, the methods of the present disclosure are not limited to the particularly illustrated order or arrangement. The various steps of the methods described herein can be omitted, rearranged, combined, and/or adapted in various ways without deviating from the scope of the present disclosure.

Each of the analyzers 123, controllers 125, frame signature generator 224, shot controller 304, analysis policy evaluator 306, lightweight temporal analyzer 402, online clusterer 502, frame signature generator 506, similarity calculator 508, and clusters updater 510 can include computer logic utilized to provide desired functionality. Each of the analyzers 123, controllers 125, frame signature generator 224, shot controller 304, analysis policy evaluator 306, lightweight temporal analyzer 402, online clusterer 502, frame signature generator 506, similarity calculator 508, and clusters updater 510 can be implemented in hardware, firmware, and/or software controlling a general purpose processor. For example, in some implementations, each of the analyzers 123, controllers 125, frame signature generator 224, shot controller 304, analysis policy evaluator 306, lightweight temporal analyzer 402, online clusterer 502, frame signature generator 506, similarity calculator 508, and clusters updater 510 includes program files stored on a storage device, loaded into a memory and executed by one or more processors. In other implementations, each of the analyzers 123, controllers 125, frame signature generator 224, shot controller 304, analysis policy evaluator 306, lightweight temporal analyzer 402, online clusterer 502, frame signature generator 506, similarity calculator 508, and clusters updater 510 includes one or more sets of computer-executable instructions that are stored in a tangible computer-readable storage medium such as RAM hard disk or optical or magnetic media.

What is claimed is:

1. An image capture device, comprising:
    an imaging hardware pipeline, wherein the imaging hardware pipeline comprises:
        an image sensor that is operable to capture raw image data; and
        one or more hardware blocks that are operable to process the raw image data to contribute to formation of an image;
        wherein the imaging hardware pipeline generates one or more hardware-generated statistics;
    one or more processors; and
    one or more non-transitory computer-readable media that store instructions that, when executed by the one or more processors, cause the image capture device to perform operations, wherein the operations comprise:
        obtaining the one or more hardware-generated statistics generated by the imaging hardware pipeline;
        analyzing the one or more hardware-generated statistics to determine one or more metrics for the raw image data or the image; and
        determining a downstream operation of the image capture device relative to the image based at least in part on the one or more metrics determined from the hardware-generated statistics, wherein the downstream operation of the image capture device relative to the image comprises a post-processing operation that is performed by the image capture device on the image subsequent to formation of the image by the imaging hardware pipeline.

2. The image capture device of claim 1, wherein the one or more hardware-generated statistics generated by the imaging hardware pipeline comprise one or more of:
    a red color histogram;
    a blue color histogram;
    a green color histogram;
    a luma histogram;
    auto white balance statistics;
    auto focus statistics;
    auto exposure statistics;
    one or more image thumbnails; and
    a high-frequency map.

3. The image capture device of claim 1, wherein analyzing the one or more hardware-generated statistics to determine one or more metrics for the raw image data or the image comprises determining a temporal similarity metric for the image relative to at least one previously captured image based at least in part on the one or more hardware-generated statistics.

4. The image capture device of claim 1, wherein analyzing the one or more hardware-generated statistics to determine one or more metrics for the raw image data or the image comprises determining a diversity metric for the image relative to at least one previously captured image based at least in part on the one or more hardware-generated statistics.

5. The image capture device of claim 1, wherein analyzing the one or more hardware-generated statistics to determine one or more metrics for the raw image data or the image comprises determining an image or video quality metric for the image based at least in part on the one or more hardware-generated statistics.

6. The image capture device of claim 1, wherein analyzing the one or more hardware-generated statistics to determine one or more metrics for the raw image data or the image comprises determining a motion saliency metric for the image based at least in part on the one or more hardware-generated statistics.

7. The image capture device of claim 6, further comprising:
    a machine-learned regression model trained to provide a quality score;
    wherein determining the image or video quality metric for the image based at least in part on the one or more hardware-generated statistics comprises:
        inputting data descriptive of the one or more hardware-generated statistics into the machine-learned regression model; and
        receiving the quality score for the image as an output of the machine-learned regression model.

8. The image capture device of claim 1, wherein determining the downstream operation of the image capture device relative to the image based at least in part on the one or more metrics determined from the hardware-generated statistics comprises determining, based at least in part on the one or more metrics determined from the hardware-generated statistics, whether to store a non-temporary copy of the image in a non-volatile memory or whether to discard a temporary copy of the image stored in a volatile memory, without storing the non-temporary copy of the image in the non-volatile memory.

9. The image capture device of claim 1, wherein determining the downstream operation of the image capture device relative to the image based at least in part on the one or more metrics determined from the hardware-generated statistics comprises determining whether to provide the image to an additional machine-learned model for scene analysis based at least in part on the one or more metrics determined from the hardware-generated statistics.

10. The image capture device of claim 1, wherein determining the downstream operation of the image capture device relative to the image based at least in part on the one or more metrics determined from the hardware-generated statistics comprises determining whether to provide the image to a neural network for scene analysis based at least in part on the one or more metrics determined from the hardware-generated statistics.

11. The image capture device of claim 1, wherein determining the downstream operation of the image capture device relative to the image based at least in part on the one or more metrics determined from the hardware-generated statistics comprises determining, based at least in part on the one or more metrics determined from the hardware-generated statistics, whether to select the image for inclusion in a hyperlapse video or a burst video.

12. The image capture device of claim 1, wherein determining the downstream operation of the image capture device relative to the image based at least in part on the one or more metrics determined from the hardware-generated statistics comprises determining, based at least in part on the one or more metrics determined from the hardware-generated statistics, whether to select the image for inclusion in a curated summary of an image collection.

13. The image capture device of claim 1, further comprising:
determining, based at least in part on the one or more metrics determined from the hardware-generated statistics, whether to capture additional images that depict a same scene as the image.

14. The image capture device of claim 1; wherein:
obtaining the one or more hardware-generated statistics generated by the imaging hardware pipeline comprises obtaining at least one of auto white balance statistics, auto focus statistics, and auto focus statistics;
analyzing the one or more hardware-generated statistics to determine one or more metrics for the raw image data or the image comprises determining a temporal similarity metric for the image relative to at least one previously captured image based at least in part on the at least one of the auto white balance statistics; the auto focus statistics, and the auto focus statistics; and
determining the downstream operation of the image capture device relative to the image based at least in part on the one or more metrics determined from the hardware-generated statistics comprises adjusting, based at least in part on the temporal similarity metric determined for the image relative to the at least one previously captured image, a frequency of usage of a neural network that analyzes a scene depicted by the image.

15. The image capture device of claim 1, wherein:
obtaining the one or more hardware-generated statistics generated by the imaging hardware pipeline comprises obtaining at least one of auto white balance statistics, auto focus statistics, and auto focus statistics;
analyzing the one or more hardware-generated statistics to determine one or more metrics for the raw image data or the image comprises:
generating a frame signature for the image based at least in part on the at least one of the auto white balance statistics, the auto focus statistics, and the auto focus statistics; and
comparing the frame signature for the image to a plurality of existing frame signature clusters to determine a diversity metric for the image; and
determining the downstream operation of the image capture device relative to the image based at least in part on the one or more metrics determined from the hardware-generated statistics comprises making at least one save decision or curation decision based at least in part on the diversity metric determined for the image.

16. A computing system, comprising:
one or more processors; and
one or more non-transitory computer-readable media that store instructions that, when executed by the one or more processors, cause the image capture device to perform operations, wherein the operations comprise:
obtaining one or more hardware-generated statistics generated by an imaging hardware pipeline, wherein the imaging hardware pipeline comprises an image sensor that is operable to capture raw image data and one or more hardware blocks that are operable to process the raw image data to contribute to formation of an image;
analyzing the one or more hardware-generated statistics to determine one or more metrics for the raw image data or the image; and
determining a downstream operation of the computing system relative to the image based at least in part on the one or more metrics determined from the hardware-generated statistics, wherein the downstream operation of the image capture device relative to the image comprises a post-processing operation that is performed by the image capture device on the image subsequent to formation of the image by the imaging hardware pipeline.

17. The computing system of claim 16, wherein analyzing the one or more hardware-generated statistics to determine the one or more metrics for the raw image data or the image comprises analyzing the one or more hardware-generated statistics to determine one or more of the following based at least in part on the one or more hardware-generated statistics:
a temporal similarity metric for the image relative to at least one previously captured image;
a diversity metric for the image relative to at least one previously captured image;
an image or video quality metric for the image; and
a motion saliency metric for the image.

18. The computing system of claim 16, wherein determining the one or more metrics determined from the hardware-generated statistics comprises determining at least one of the following based at least in part on the one or more metrics determined from the hardware-generated statistics:
whether to discard a temporary copy of the image stored in a volatile memory without storing the non-temporary copy of the image in the non-volatile memory;

whether to provide the image to an additional machine-learned model for scene analysis;

whether to select the image for inclusion in a hyperlapse video or a burst video; and whether to select the image for inclusion in a curated summary of an image collection.

19. A computer-implemented method, the method comprising:

obtaining; by one or more computing devices, one or more hardware-generated statistics generated by an imaging hardware pipeline, wherein the imaging hardware pipeline comprises an image sensor that is operable to capture raw image data and one or more hardware blocks that are operable to process the raw image data to contribute to formation of an image;

analyzing, by the one or more computing devices, the one or more hardware-generated statistics to determine one or more metrics for the raw image data or the image; and determining, by the one or more computing devices, a downstream operation relative to the image based at least in part on the one or more metrics determined from the hardware-generated statistics, wherein the downstream operation of the image capture device relative to the image comprises a post-processing operation that is performed by the image capture device on the image subsequent to formation of the image by the imaging hardware pipeline.

* * * * *